US011157684B2

(12) United States Patent
Chiba et al.

(10) Patent No.: US 11,157,684 B2
(45) Date of Patent: Oct. 26, 2021

(54) CONTEXTUAL MENU WITH ADDITIONAL INFORMATION TO HELP USER CHOICE

(71) Applicant: Microsoft Technology Licensing, LLC, Redmond, WA (US)

(72) Inventors: Kenichiro Chiba, Redmond, WA (US); Alfredo Arnaiz, Bellevue, WA (US); Dermot McLoughlin, Dublin (IE); Nicole Michel, Dublin (IE); Hany G. Gerges, Bothell, WA (US); Michael Koenig, Bellevue, WA (US); Maria Isabel R. Carpenter, Lynnwood, WA (US); Shikha Devesh Desai, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/354,381

(22) Filed: Nov. 17, 2016

(65) Prior Publication Data

US 2017/0220536 A1 Aug. 3, 2017

Related U.S. Application Data

(60) Provisional application No. 62/289,866, filed on Feb. 1, 2016, provisional application No. 62/289,856, filed (Continued)

(51) Int. Cl.

*G06F 40/253* (2020.01)
*G06F 3/0482* (2013.01)

(Continued)

(52) U.S. Cl.

CPC .......... *G06F 40/166* (2020.01); *G06F 3/0482* (2013.01); *G06F 3/167* (2013.01);

(Continued)

(58) Field of Classification Search

CPC ............................ G06F 17/273; G06F 17/274

See application file for complete search history.

(56) References Cited

U.S. PATENT DOCUMENTS

| | | | |
|---|---|---|---|
| 4,859,091 | A | 8/1989 | Ueda |
| 5,678,053 | A | 10/1997 | Anderson |

(Continued)

FOREIGN PATENT DOCUMENTS

| | | |
|---|---|---|
| EP | 0093249 | 11/1983 |

OTHER PUBLICATIONS

"Find Inconsistencies in Your Writing", Available at: https://prowritingaid.com/art/14/Find-inconsistencies-in-your-writing.aspx, Apr. 7, 2012, 5 pages.

(Continued)

*Primary Examiner* — Scott T Baderman
*Assistant Examiner* — Benjamin Smith
(74) *Attorney, Agent, or Firm* — Merchant & Gould P.C.

(57) ABSTRACT

In non-limiting examples, the present disclosure is directed to systems and methods for performing an analysis of an electronic document comprising a review for a plurality of writing issues related to the electronic document's conformance to a specified target audience; causing, in an application associated with the electronic document, one or more flagged writing issues identified by the analysis of the electronic document to be displayed; receiving a selection of a flagged writing issue; and based on the selection of the flagged writing issue, causing, in a contextual menu, one or more alternative suggestions to replace text associated with the flagged writing issue to be displayed, the one or more alternative suggestions based, at least in part, on a fluency metric and a resemblance of the one or more alternative suggestions to the text associated with the flagged writing issue.

22 Claims, 15 Drawing Sheets

Related U.S. Application Data on Feb. 1, 2016, provisional application No. 62/289,805, filed on Feb. 1, 2016.

(51) Int. Cl.

| | |
|---|---|
| ***G06F 40/166*** | (2020.01) |
| ***G06F 9/451*** | (2018.01) |
| ***G06F 40/47*** | (2020.01) |
| ***G06F 40/109*** | (2020.01) |
| ***G06F 40/117*** | (2020.01) |
| ***G06F 40/232*** | (2020.01) |
| ***G06F 40/247*** | (2020.01) |
| ***G06F 40/295*** | (2020.01) |
| ***G06F 3/16*** | (2006.01) |

(52) U.S. Cl.

CPC ............ *G06F 9/453* (2018.02); *G06F 40/109* (2020.01); *G06F 40/117* (2020.01); *G06F 40/232* (2020.01); *G06F 40/247* (2020.01); *G06F 40/253* (2020.01); *G06F 40/295* (2020.01); *G06F 40/47* (2020.01)

(56) References Cited

U.S. PATENT DOCUMENTS 5,960,447 A * 9/1999 Holt ........................ G10L 15/26 704/235
6,085,206 A 7/2000 Domini et al.
6,175,834 B1 1/2001 Cai et al.
6,583,798 B1 6/2003 Hoek et al.
6,611,802 B2 8/2003 Lewis et al.
6,889,361 B1 5/2005 Bates et al.
6,918,086 B2 7/2005 Rogson
7,069,508 B1 6/2006 Bever et al.
7,260,773 B2 8/2007 Zernik
7,424,674 B1 * 9/2008 Gross .................... G06F 17/274 709/203
7,752,034 B2 7/2010 Brockett et al.
7,778,816 B2 7/2010 Reynar
7,908,132 B2 3/2011 Brockett et al.
8,078,451 B2 12/2011 Dolan et al.
8,136,037 B2 3/2012 Adams et al.
8,392,390 B2 * 3/2013 Bennett ................. G06F 40/253 707/705
8,645,124 B2 * 2/2014 Karov Zangvil ..... G06F 17/273 704/1
8,886,735 B1 11/2014 Liu et al.
8,903,719 B1 12/2014 Landry et al.
8,914,278 B2 * 12/2014 Zangvil ................. G06F 17/273 382/177
9,002,700 B2 * 4/2015 Hoover ................. G06F 17/274 704/9
9,015,036 B2 * 4/2015 Karov Zangvil ..... G06F 3/0237 704/9
9,026,432 B2 * 5/2015 Zangvil ................. G06F 17/273 704/10
9,436,676 B1 * 9/2016 Korn ....................... G06F 40/30
9,459,846 B2 10/2016 Bornheimer et al.
9,465,793 B2 * 10/2016 Hoover ................. G06F 17/274
9,665,559 B2 * 5/2017 Gross .................... G06F 17/274
9,672,203 B1 * 6/2017 Bhar ..................... G06F 17/271
2003/0004716 A1 * 1/2003 Haigh ..................... G10L 15/10 704/238
2004/0030540 A1 * 2/2004 Ovil ...................... G06F 40/253 704/1
2004/0153466 A1 8/2004 Ziff et al.
2004/0249630 A1 * 12/2004 Parry .................... G06F 40/253 704/5
2005/0125215 A1 6/2005 Wu et al.
2006/0123329 A1 * 6/2006 Steen .................... G06F 17/248 715/270
2006/0143564 A1 * 6/2006 Bates .................. G06F 17/2247 715/257
2006/0212441 A1 * 9/2006 Tang ................... G06F 16/3346
2006/0247914 A1 * 11/2006 Brener .................. G06F 17/274 704/1
2006/0282413 A1 12/2006 Bondi
2007/0067294 A1 3/2007 Ward et al.
2008/0071612 A1 3/2008 Mah et al.
2008/0077570 A1 * 3/2008 Tang ................... G06F 16/3346
2008/0195379 A1 * 8/2008 Vanderwold .......... G06F 17/274 704/9
2008/0208567 A1 * 8/2008 Brockett ............... G06F 17/273 704/9
2009/0006950 A1 * 1/2009 Gross .................... G06F 17/274 715/259
2009/0055761 A1 * 2/2009 Basson ................... G06F 17/24 715/764
2009/0171649 A1 7/2009 Kishore et al.
2009/0235159 A1 9/2009 Hosoda
2009/0319927 A1 12/2009 Beeman et al.
2010/0228365 A1 * 9/2010 Chrobok-Diening ........................ G06F 17/274 700/86
2010/0257182 A1 * 10/2010 Saliba ................... G06F 17/274 707/747
2010/0275118 A1 10/2010 Iakobashvili et al.
2010/0286979 A1 * 11/2010 Zangvil ................. G06F 17/273 704/9
2011/0035364 A1 2/2011 Lipsey
2011/0055192 A1 * 3/2011 Tang ..................... G06F 16/951 707/706
2011/0086331 A1 * 4/2011 Karov Zangvil ........ G09B 7/00 434/169
2011/0191105 A1 8/2011 Spears
2011/0313757 A1 * 12/2011 Hoover ................. G06F 17/274 704/9
2012/0297294 A1 11/2012 Scott et al.
2013/0006613 A1 * 1/2013 Karov Zangvil ..... G06F 3/0237 704/9
2013/0055074 A1 2/2013 Trese et al.
2013/0073531 A1 3/2013 Robinson et al.
2013/0179169 A1 7/2013 Sung et al.
2013/0226927 A1 8/2013 Verma et al.
2014/0032683 A1 1/2014 Maheshwari et al.
2014/0120961 A1 5/2014 Buck
2014/0122062 A1 * 5/2014 Zangvil ................. G06F 17/273 704/9
2014/0282837 A1 9/2014 Heise et al.
2014/0288915 A1 * 9/2014 Madnani ............... G06F 17/274 704/2
2014/0289617 A1 9/2014 Rajagopalan
2014/0342341 A1 11/2014 Rea
2015/0104763 A1 * 4/2015 Hausmann ............ G06F 3/0481 434/169
2015/0149876 A1 5/2015 Davis et al.
2015/0154174 A1 * 6/2015 Hoover ................. G06F 17/274 704/9
2015/0199318 A1 7/2015 Lemonik
2015/0220509 A1 * 8/2015 Karov Zangvil ..... G06F 3/0237 704/9
2015/0309983 A1 * 10/2015 Hoover ................. G06F 17/274 704/9
2016/0087925 A1 3/2016 Kalavagattu et al.
2016/0103808 A1 * 4/2016 Anders ................. G06F 16/335 715/261
2016/0162473 A1 * 6/2016 Cogley ................... G06F 17/28 704/9
2016/0246772 A1 * 8/2016 Hoover ................. G06F 17/274
2016/0371248 A1 * 12/2016 Hoover ................. G06F 17/274
2017/0220360 A1 * 8/2017 Chiba ................. H04L 49/9068
2017/0220535 A1 * 8/2017 Olsen .................. G06F 17/2282
2018/0067912 A1 * 3/2018 DeLuca .................. G06F 17/24

OTHER PUBLICATIONS

"Frontlab Proofing—Solutions", Available at: http://www.frontlab.com/proofing/solutions.aspx, Mar. 9, 2016, 3 pages.

(56) References Cited

OTHER PUBLICATIONS

"Grammarly", Available at: https://www.grammarly.com/spell-check, Jan. 15, 2016, 11 pages.
"MST Redact", Available at: http://www.ms-technology.com/viewing-solutions/redact/#HyPerLink_format, Mar. 9, 2016, 2 pages.
"Proofreading Support", Available at: https://en.support.wordpress.com/proofreading/, Feb. 2, 2016, 6 pages.
"Smart Translate", Available at: http://www.2x4.de/#!smart-translate/mptfb, Mar. 9, 2016, 6 pages.
"StyleWriter Professional Writing and Editing Software Features", Available at: http://www.editorsoftware.com/StyleWriter_Features.html#professional_proofreading_editing_writing_software, Aug. 9, 2013, 3 pages.
"Understanding Proofreading and Copyediting", Available at: http://www.avsgroup.com/articles/articletype/articleview/articleid/20/proofreading-and-copyediting, Feb. 13, 2015, 1 page.
Agrawal, Harsh, "5 Free Online Proofreader Tools for Error-Free Writing", Available at: http://www.shoutmeloud.com/online-proofreading-tools-english-writing.html, Mar. 17, 2015, 7 pages.
Kukich, Karen, "Techniques for Automatically Correcting Words in Text", In Journal of ACM Computing Surveys, vol. 24, Issue 4, Dec. 1992, 63 pages.
Mapue, Joseph, "50 Best Microsoft Word Add-ins: Take Documents from Awful to Awesome", Available at: http://www.skilledup.com/articles/50-best-microsoft-word-add-ins, Jul. 23, 2014, 13 pages.
Mastykarz, Waldek, "Easy search and replace with Mavention Search and Replace", Available at: https://blog.mastykarz.nl/spell-checking-brand-names-mavention-spell-check/, Sep. 29, 2012, 8 pages.
Matt, "How to Stop Word 2010 from Underlining Misspelled Words", Available at: http://www.solveyourtech.com/how-to-stop-word-2010-from-underlining-misspelled-words/, May 4, 2015, 7 pages.
Mccandlish, Stanton, "EFF's Top 12 Ways to Protect Your Online Privacy", Available at: https://www.eff.org/wp/effs-top-12-ways-protect-your-online-privacy, Apr. 2002, 10 pages.
Schwartz, Steve, "Getting Started with Word 2013", Available at: http://www.peachpit.com/articles/article.aspx?p=2044335&seqNum=7, Apr. 22, 2013, 7 pages.
Anonymous, "After the Deadline (Extension for OpenOffice.org)", Aug. 22, 2010, retrieved from the internet on Arp. 11, 2017 at: http://web.archive.org/web/20100822031718/http://www.afterthedeadline.com/download.slp?platform=OpenOffice, 3 pgs.
PCT International Search Report and Written Opinion in International Application PCT/US2017/015537, dated May 2, 2017, 14 pgs.
PCT International Search Report and Written Opinion in International Application PCT/US2017/015538, dated May 4, 2017, 13 pgs.
PCT International Search Report and Written Opinion in International Application PCT/US2017/016049, dated Apr. 21, 2017, 18 pgs.
U.S. Appl. No. 15/270,563, Office Action dated Dec. 7, 2017, 19 pages.
"Final Office Action Issued in U.S. Appl. No. 15/270,563", dated Sep. 14, 2018, 18 Pages.
"Non Final Office Action Issued in U.S. Appl. No. 15/270,563", dated Jan. 8, 2019, 18 Pages.
"Non Final Office Action Issued in U.S. Appl. No. 15/344,283", dated Jan. 10, 2019, 31 Pages.
"Final Office Action Issued in U.S. Appl. No. 15/344,283", dated Jul. 9, 2019, 34 Pages.
"Final Office Action Issued in U.S. Appl. No. 15/270,563", dated Jul. 23, 2019, 19 Pages.
"Non Final Office Action Issued in U.S. Appl. No. 15/344,283", dated Dec. 9, 2019, 35 Pages.
"Microsoft Word 2013 An Essential Guide", Retrieved From: http://www.reading.ac.uk/web/files/its/WordEssen13.pdf, 2014, 17 Pages.
"Final Office Action Issued in U.S. Appl. No. 15/344,283", dated Jun. 25, 2020, 10 Pages.
"Non Final Office Action Issued in U.S. Appl. No. 15/270,563", dated May 18, 2020, 20 Pages.
"Final Office Action Issued in U.S. Appl. No. 15/270,563", dated Oct. 19, 2020, 18 Pages.
"Non Final Office Action Issued in U.S. Appl. No. 15/270,563", dated Jun. 28, 2021, 15 Pages.

* cited by examiner

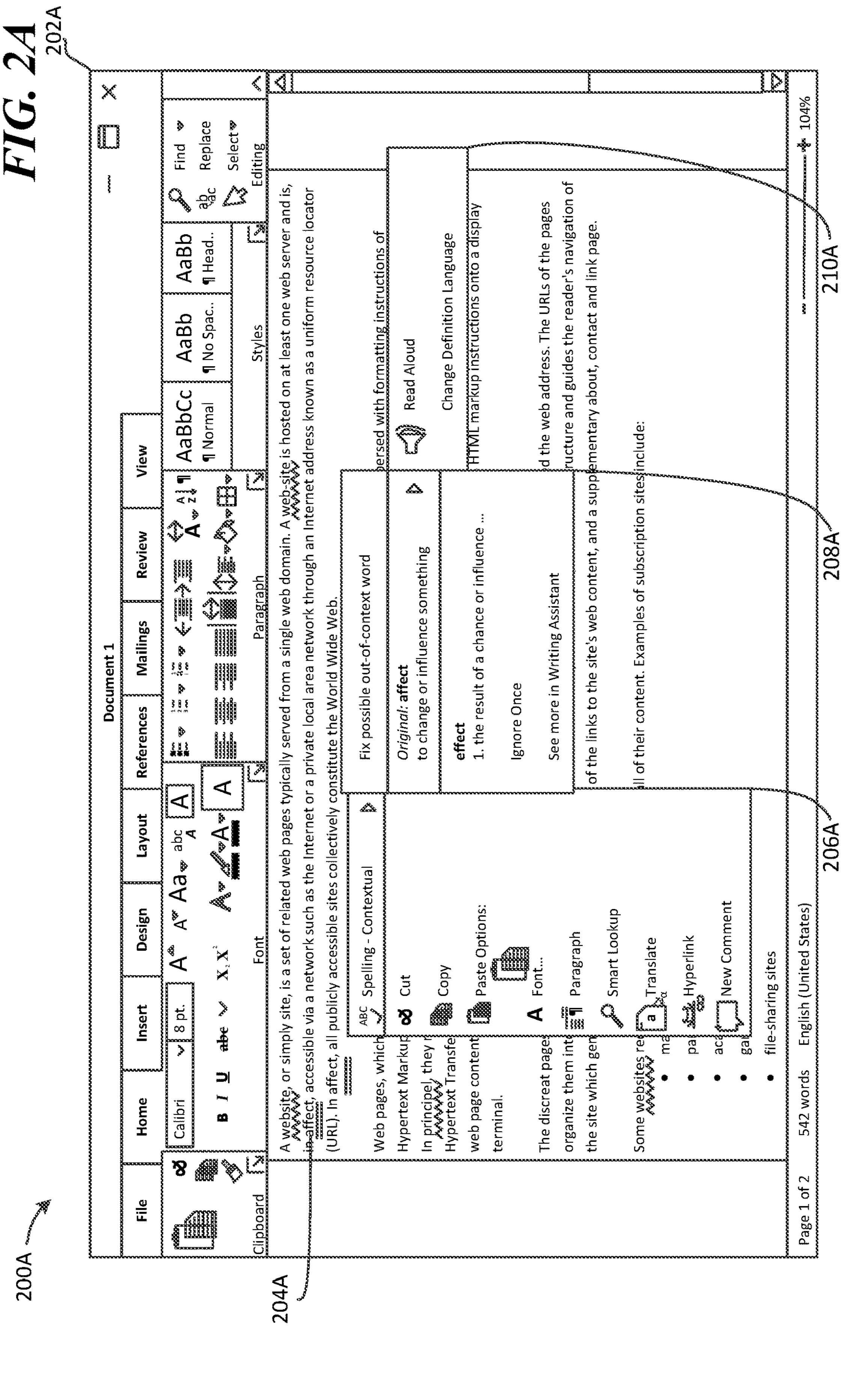

| File | Home | Insert | Design | Layout | References | Mailings | Review | View |

Document 1

Clipboard | Font | Paragraph | Styles | Editing

A website, or simply site, is a set of related web pages typically served from a single web domain. A web-site is hosted on at least one web server and is, in affect, accessible via a network such as the Internet or a private local area network through an Internet address known as a uniform resource locator (URL). In affect, all publicly accessible sites collectively constitute the World Wide Web.

Web pages, which ersed with formatting instructions of

ABC Spelling - Contextual

Fix possible out-of-context word

Hypertext Markup
In principel, they
Hypertext Transfe

✂ Cut

📋 Copy

📋 Paste Options:

*Original:* affect
to change or influence something

🔊 Read Aloud

Change Definition Language web page content
terminal.

A Font...

effect
1. the result of a chance or influence ...

HTML markup instructions onto a display d the web address. The URLs of the pages The discreat page
organize them int
the site which ge ¶ Paragraph
🔍 Smart Lookup Ignore Once See more in Writing Assistant ructure and guides the reader's navigation of Some websites re
   • m
   • pa
   • ac
   • ga
   • file-sharing sites a Translate
Hyperlink
New Comment of the links to the site's web content, and a supplementary about, contact and link page.
ll of their content. Examples of subscription sites include:

204A
206A
208A
210A
202A

Page 1 of 2    542 words    English (United States)    104%

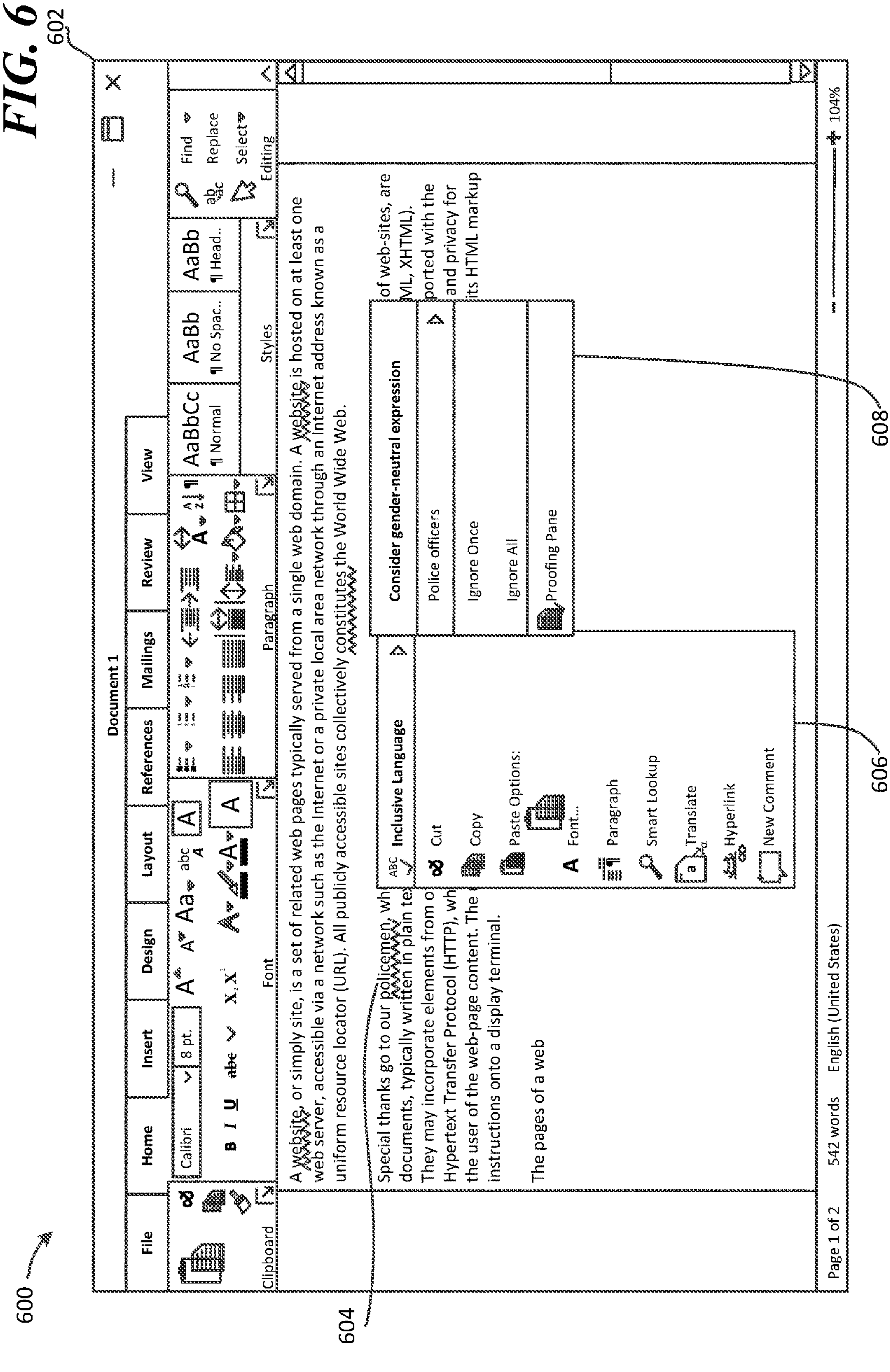

FIG. 6

*[Screenshot of a word processing application window labeled "Document 1" showing a document with text about websites. A right-click context menu (604) is displayed with options including "Inclusive Language", Cut, Copy, Paste Options, Font..., Paragraph, Smart Lookup, Translate, Hyperlink, New Comment. A submenu (606) titled "Consider gender-neutral expression" shows options: "Police officers", "Ignore Once", "Ignore All", "Proofing Pane". Label 602 points to the application window; 608 points to document text.]*

Document text visible:
A website, or simply site, is a set of related web pages typically served from a single web domain. A website is hosted on at least one web server, accessible via a network such as the Internet or a private local area network through an Internet address known as a uniform resource locator (URL). All publicly accessible sites collectively constitutes the World Wide Web.

Special thanks go to our policemen, wh... documents, typically written in plain te... Hypertext Transfer Protocol (HTTP), wh... the user of the web-page content. The... instructions onto a display terminal.

The pages of a web

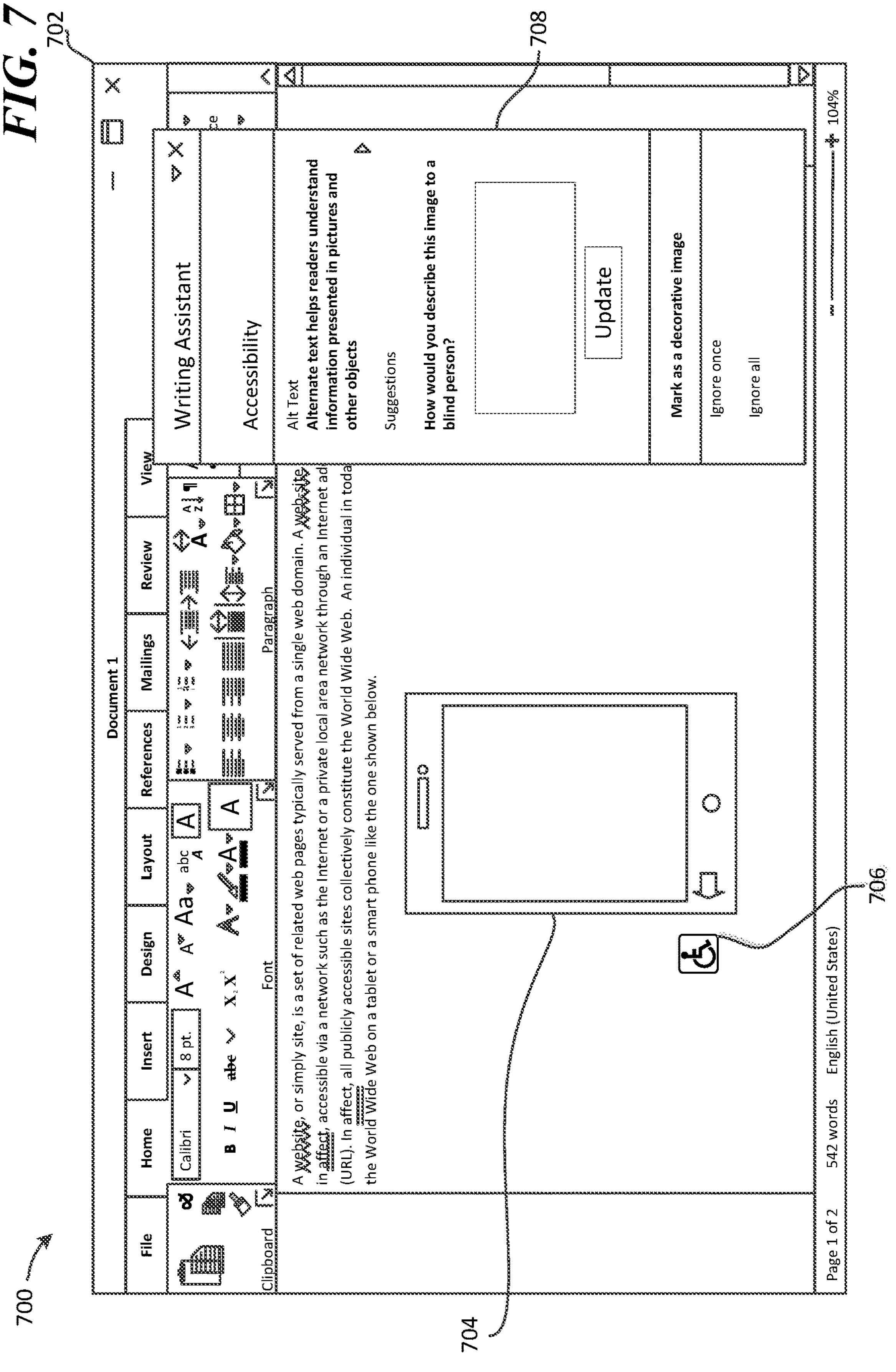

FIG. 7

Document 1

File | Home | Insert | Design | Layout | References | Mailings | Review | View

Calibri | 8 pt.
B  I  U  abc  X₂ X²  Aa  abc A A

Font | Paragraph

A website, or simply site, is a set of related web pages typically served from a single web domain. A website in affect, accessible via a network such as the Internet or a private local area network through an Internet ad (URL). In affect, all publicly accessible sites collectively constitute the World Wide Web. An individual in toda the World Wide Web on a tablet or a smart phone like the one shown below.

Writing Assistant

Accessibility

Alt Text
Alternate text helps readers understand information presented in pictures and other objects Suggestions How would you describe this image to a blind person?

[Update]

Mark as a decorative image

Ignore once
Ignore all

Page 1 of 2 | 542 words | English (United States) | 104%

CONTEXTUAL MENU WITH ADDITIONAL INFORMATION TO HELP USER CHOICE

CROSS-REFERENCE TO RELATED APPLICATIONS

This application claims the benefit of U.S. Provisional Application Ser. No. 62/289,866, filed Feb. 1, 2016, the complete disclosure of which is hereby incorporated by reference in its entirety.

Details regarding the present disclosure are also provided in U.S. Provisional Application Ser. No. 62/289,856, entitled "Proofing Task Pane", filed Feb. 1, 2016; and U.S. Provisional Application Ser. No. 62/289,805, entitled "Enterprise Writing Assistance", filed Feb. 1, 2016, the entireties of which are hereby incorporated by reference.

BACKGROUND

Document review systems such as spell check and grammar check are integral processes of most word processing applications. These processes allow a user to identify instances of spelling and grammar issues within those documents. One way these processes may be implemented is by visually indicating to a user that words or terms are misspelled or that there are grammar errors within a document by underlining those errors within the document. Thus, a user may scroll through a document to look for those underlined words or terms and manually choose to modify them or ignore them.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Non-limiting examples of the present disclosure describe systems and methods for causing a contextual menu in an electronic document to be displayed, comprising: performing a first analysis of the electronic document comprising a review for a plurality of writing issues related to the electronic document's conformance to a specified target audience; causing, in an application associated with the electronic document, one or more flagged writing issues identified by the analysis of the electronic document to be displayed; receiving a selection of a flagged writing issue; and based on the selection of the flagged writing issue, causing, in the contextual menu, one or more alternative suggestions to replace text associated with the flagged writing issue to be displayed, the one or more alternative suggestions based, at least in part, on a fluency metric and a resemblance of the one or more alternative suggestions to the text associated with the flagged writing issue.

BRIEF DESCRIPTION OF THE DRAWINGS

Non-limiting and non-exhaustive examples are described with reference to the following figures.

FIG. 2A illustrates an exemplary contextual menu of a word processing application for a context-sensitive spelling issue in a document with three layers of the contextual menu displayed.

FIG. 6 illustrates an exemplary contextual menu of a word processing application for an inclusive language issue in a document with two layers of the contextual menu displayed.

FIG. 7 illustrates an exemplary contextual menu writing assistant for an accessibility issue in a document related to seeing impaired users.

DETAILED DESCRIPTION

Figure 1:
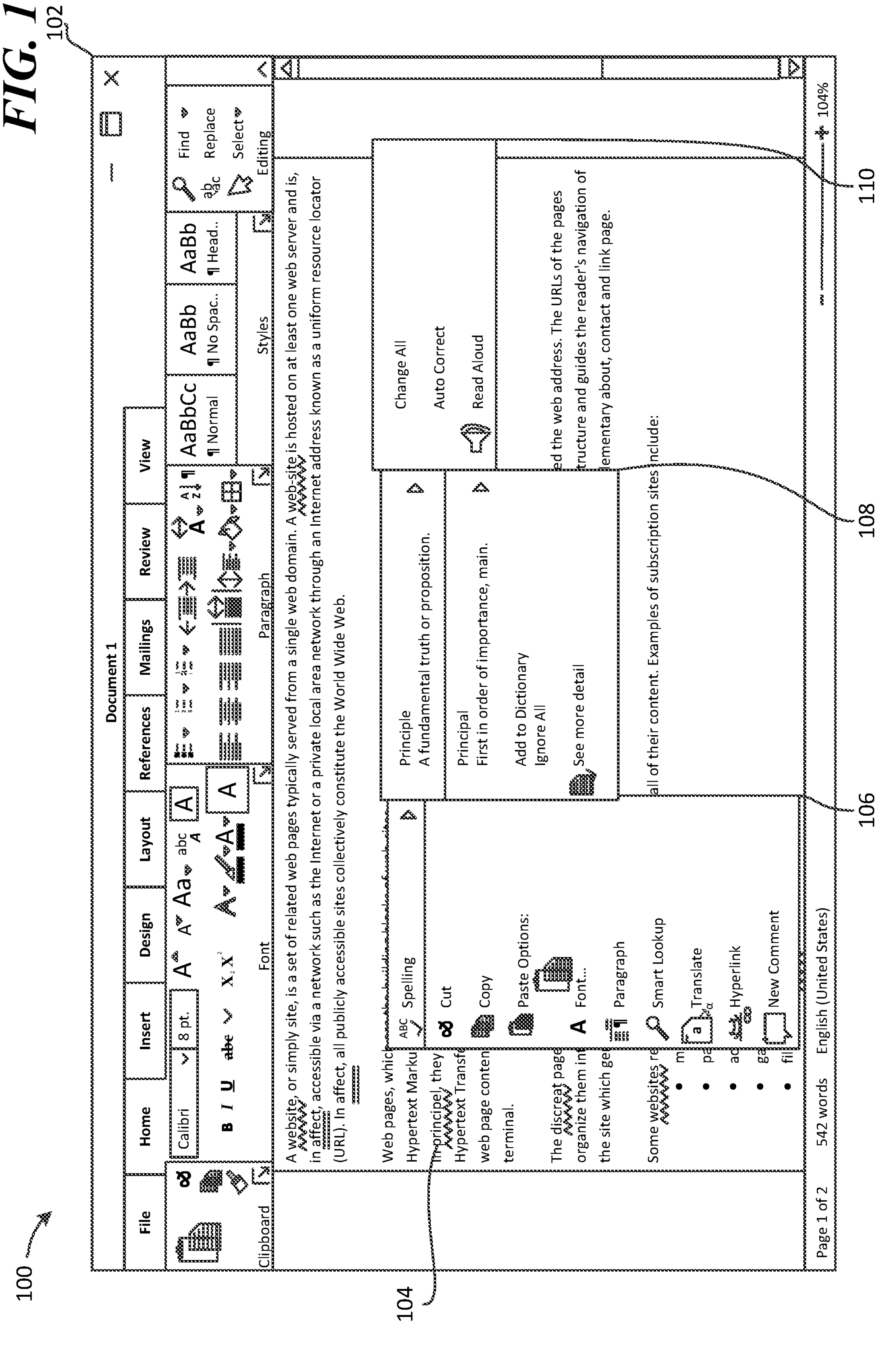
FIG. 1 illustrates an exemplary contextual menu of a word processing application for a spelling issue in a document with three layers of the contextual menu displayed.

Various aspects are described more fully below with reference to the accompanying drawings, which form a part hereof, and which show specific exemplary aspects. However, examples may be implemented in many different forms and should not be construed as limited to the examples set forth herein. Accordingly, examples may take the form of a hardware implementation, or an entirely software implementation, or an implementation combining software and hardware aspects. The following detailed description is, therefore, not to be taken in a limiting sense.

Generally the present disclosure is directed to providing, in a document authoring application (e.g., a word processing application, a slide show presentation application, an email application, a notes application, a web-based document authoring and/or editing application etc.), a contextual menu. The contextual menu is a unified and compact user experience that provides recommended alternatives, synonyms or definitions, explanations, relating to a word, term or phrase that has been flagged for having a particular issue (e.g., misspelling, grammatical issue, or writing issue). In particular, the contextual menu may be provided as a user interface that is positioned, for example, next to the flagged word or phrase and over the document text itself, thus easily and quickly assisting the user to modify or understand issues in the document.

As used herein "flagged" means that an issue is being highlighted or otherwise indicated, via a display, for a user as being recognized by the systems and methods described herein as implicating one or more rules governed by a context menu setting. According to additional examples "flagged" issues may also be recognized and highlighted by the systems and methods described herein based on language modeling criteria and/or machine learning. Such language modeling criteria may include training one or more language models through the analysis of one or more corpus, as well as machine learning and direct human curation of such models. A flagged word or phrase may be flagged by an actual flag being displayed next to the word or phrase, by underlining the word or phrase, by providing an undulating underline for the word or phrase, by highlighting the word or phrase, by bolding the word or phrase, etc. According to some examples words and phrases may be highlighted in different manners based on the form and/or context of a word or phrase. For example, solid underlines may be used to highlight words and phrases that relate to short runs of text and broken lines may be used to highlight words and phrases near punctuation to ensure that users can distinguish whether punctuation at the end of a word or phrase is included in the flag. Additionally, issues relating to photographs and other embedded objects and files may also be flagged in any manner such that attention may be drawn to a contextual menu issue as it relates to those pictures, objects and files.

In some examples, the contextual menu provides the user with alternative suggestions for the flagged word or phrase, synonyms or definitions, explanations of the issues, or any combination thereof. The suggestions and explanations for the suggestions provided in the contextual menu generally take the form of layers in a reverse tree hierarchy, with each subsequent layer providing additional context and information regarding a suggestion or explanation for a suggestion for modifying content in a document. The reverse tree hierarchy provides a first node (corresponding to a first layer in the contextual menu) which provides a very basic overview of a flagged issue (e.g., a flagged issue relates to a spelling issue, a grammar issue, a consistency issue, etc.), the next layer or tier in the tree may provide a plurality of nodes (corresponding to a second layer in the contextual menu) providing context and additional explanation regarding the flagged issue and a suggested change (e.g., a synonyms or definition of a flagged word or suggested replacement word, a more specific reason why a word or phrase has been flagged, etc.). At a next layer or tier in the tree (corresponding to a third layer in the contextual menu) further context and additional explanation regarding the flagged issue and a suggested change may be provided in yet further nodes. For example, in the third layer or tier, nodes may be provided for reading the flagged word or phrase aloud, reading a suggested replacement word or phrase aloud, changing a synonym or definition language for a flagged word or phrase, changing a synonym or definition language for a suggested replacement word or phrase, etc.

As described herein, based on the location of the word or phrase at issue, the contextual menu may hover over the text of the document, thereby maximizing the display space that might otherwise be occupied by a task pane on the side of the display or other user interface in which this type of information may be displayed. Thus, displaying such a contextual menu in a minimal and compact way allows a user to understand details relating to the flagged word or phrase while also maximizing the display space of a display on which the word processing application is operating. This is particularly relevant when a user is on a mobile device such as a cell phone, a tablet, or a laptop in which there is insufficient display space to display a task pane on the side of a display to provide such contextual information regarding the flagged word or phrase.

As described herein, the contextual menu provides recommended alternatives, synonyms or definitions, and/or explanations regarding flagged issues in the document such that users, including persons with disabilities and language learners who may be unfamiliar with assistance concepts, are provided with a quick and easy way in which to review such recommended alternatives, synonyms or definitions, and/or explanations provided in the contextual menu. Such additional context provided within the contextual menu provides an enhanced way in which users may edit a document, particularly when traditional spelling and grammar proofing options alone do not provide sufficient context for the flagged issue. The contextual menu additionally provides a user with easy access to non-proofing tasks like cut, copy and paste by, for example, providing access to such features in stacked menus, or layers, within the contextual menu.

In addition to analyzing a document for issues such as spelling, grammar and writing issues, the systems and methods described herein may also analyze document contents for accessibility issues. Accessibility issues that may be flagged include issues relating to document properties that may be difficult to interpret for seeing impaired users, hearing impaired users and learning impaired users, among others. For example, if an image is embedded in a document, that image may be flagged as an issue for seeing impaired learners and a suggestion may be provided to include text describing the image. In another example, if text is small, in an obscure font that is difficult to make out, or a difficult color to see when contrasted with a background color, those issues may also be flagged as issues for seeing impaired users and suggestions may be provided to make those portions of a document more accessible for seeing impaired learners. According to yet another example, if an audio file is embedded in a document that file may be flagged as an issue for hearing impaired users and a suggestion may be provided to describe the contents of the audio file or directly transcribe those contents.

According to examples the contextual menu may flag issues and provide relevant suggestions based on preset or customizable settings. For example, preset or customizable settings may flag different issues and therefore relevant suggestions would differ for each entity type that the contextual menu is set for. Exemplary entity types that may be selectable by a user or an administrator include entities such as: casual entity, business professional entity, academics entity, K-12 entity, college entity, PhD entity, technical paper entity, etc. The type of entity selected may provide different rule types based on an audience group for which a document is being authored for and a mechanism for customizing contextual menu settings for a user's intended purpose. In addition to rules being modified by the entity group that has been selected, other features relating to the contextual menu may also be modified such as: dictionary (e.g., technical words may be provided in a dictionary for a technical paper entity), content type (e.g., phrases and subject matter may be flagged for K-12 entities that would not be flagged for a college entity because inappropriate subject matter), and citation types (e.g., business professional entities may have different standards for providing citations for a document than, for example, a college entity or a PhD entity), among others.

According to an example, in addition to having a set of preset rules and configuration settings tied to an entity type (e.g., casual, business professional, academics, etc.) a user may also be provided with the list of rules and configuration settings for a chosen entity type and the user may be able to further customize their experience by adding or removing additional rules and configuration settings creating a personalized template for the user's contextual menu.

FIG. 1 illustrates an exemplary contextual menu of a word processing application 100. Word processing application 100 displays document 102 having a misspelled word "principel" 104. In response to a user's selection of the misspelled word "principel" 104, a contextual menu, including a first contextual menu layer 106, a second contextual menu layer 108 and a third contextual menu layer 110, is provided. According to examples a user may make a selection of a flagged issue by various means such as: hovering a displayed cursor over a flagged issue, tapping (via a touch screen) on a flagged issue, using a mouse or other input mechanism to click on a flagged issue, etc.

As illustrated, the contextual menu, comprised of a first contextual menu layer 106, a second contextual menu layer 108, and a third contextual menu layer 110, is provided near and adjacent to the misspelled word "principel" 104. As further illustrated, the contextual menu is provided as a user interface that hovers over the document text. Although this example illustrates a contextual menu displayed with reference to misspelled word "principel" 104, it is understood that the contextual menu may also be provided in response to a selection of a word or phrase that is flagged by the word processing application 100 as having grammar issues, writing issues, or issues indicating that the word may not be in compliance with organizational guidelines.

Grammar issues that may be flagged by the word processing application may include, for example, issues with syntax, improper contraction use, passive voice, homonyms, etc. Writing issues issues that may be flagged by the word processing application may include, for example, issues with word or phrase consistency (e.g., the consistent use of hyphenated or unhyphenated words or terms), clarity and conciseness (e.g., sentence complexity, use of elaborate or vague language, or other issues affecting a document's clarity and conciseness), vocabulary choice (e.g., words or terms that may not be suitable for an intended a target audience), inclusive language issues (e.g., words and terms that are considered to exclude particular groups of people), and formal language issues (e.g., words or terms that are overly formal or too informal for an intended target audience).

Returning to FIG. 1, a first contextual menu layer 106 is displayed in response to a selection of the misspelled word "principel," 104 which may also be underlined or otherwise highlighted and emphasized as being an issue that may need resolving. Further, the various issue types may be flagged with different colored underlines, highlights, or other emphasizing features corresponding to each issue type. For example, flagged spelling issues may be underlined in the document 102 in red, grammar issue types may be underlined in blue, and writing issues issue types may be underlined in yellow. Emphasizing the flagged words within a document by issue/color type allows a user to scroll through a document and quickly understand how many flagged issues are contained in a document, as well as a general understanding of the number of issues related to each issue type.

There are various ways in which a user may select a flagged word in a document such as misspelled word "principel." For example, a user may position a cursor or another pointer (if, for example, the user is operating a touch device such as a mobile phone, tablet, or laptop having a touchscreen) over a flagged word in a document, the user may select the word (e.g., a double-click, long click, right-click, left-click, etc.). Such a selection may cause the word processing application to the first layer of the contextual menu 106 which broadly identifies the category of the issue (e.g., "spelling" "grammar" or a specific writing type issue) and which also includes a fly-out user interface that leads to the second layer of the contextual menu 108. Accordingly, a user may select a flagged word to cause the word processing application to initially display the first layer of the contextual menu 106. In embodiments, in response to a user's further selection of the issue type (spelling) context feature at the top of the first layer of the contextual menu 106, the second layer of the contextual menu 108 may be displayed. In this example, the second layer of the contextual menu 108 is displayed in a fly-out window the first layer of the contextual menu 106. However, the second layer of the contextual menu 108 may be displayed in other ways such as, for example, by replacing the first layer of the contextual menu 106 or in another user interface positioned over, adjacent to, or near the flagged word or phrase.

According to aspects, the first layer of the contextual menu 106 and the second layer of the contextual menu 108 may be displayed in various forms including opaque or translucent forms so as to make viewing the entirety of document 102 easier when the first layer of the contextual menu 106 or the second layer of the contextual menu 108 are displayed over the document 102. The first layer of the contextual menu 106 may be displayed as being part of the second layer of the contextual menu 108, or separate from the second layer of the contextual menu 108. Various other display characteristics may be employed for the first layer of the contextual menu 106 and the second layer of the contextual menu 108, as well as subsequent layers of the contextual menu such as the third layers of the contextual menu 110.

According to additional aspects, the contextual menu may provide suggestions to a user, such as the first suggestion ("principle") shown in the second layer of the contextual menu 108 and the second suggestion ("principal") shown in the second layer of the contextual menu 108 as shown in FIG. 1 corresponding to flagged misspelled word "principel" 104 within document 102. By selecting one of the provided suggestions, a user may replace the flagged word or term with the selected word or term. Although only two suggestions are shown, it is understood that additional or fewer suggestions may be provided and displayed. The number of suggestions provided to a user in the contextual menu may differ based on the flagged issue type, the word, the term, or phrase. If there is more than one suggestion, the suggestions may be displayed in a drop down list or scrollable list, maximizing available space within the graphical user interface.

According to yet further aspects, the second layer of the contextual menu 108 may include additional contextual information. Such additional contextual information may include synonyms or definitions of suggested words, an explanation regarding the issue, an explanation regarding why one word may be preferred over another, an explanation regarding why a word or phrase may be inappropriate (e.g., “run-on sentence,” “word may be too complex for your target audience,” etc.). For example, turning back to FIG. 1 additional contextual information is provided for the first suggestion (defining the word “principle”), and additional contextual information is provided for second suggestion (defining the word “principal”).

According to other examples, a user may select the option to see more detail in the second layer of the contextual menu 108 and additional contextual information may be provided to the user. According to one example an Add to Dictionary feature may be available to a user, and if it is selected, the Add to Dictionary feature may provide the ability to add a flagged word or term to a dictionary of words that the word processing application will not flag in the future. For example, if misspelled word “principel” is added to the dictionary using the Add to Dictionary feature, any future instance of the word “principel” will not be flagged by the word processing application as being a misspelled word. Selecting the Ignore All feature in the second layer of the contextual menu 108 allows a user to ignore every instance of a flagged word or term within the open document. In embodiments, this functionality does not apply to subsequently created documents, however in other embodiments, this selection may apply to subsequent documents.

According to additional examples a Speak to Spell feature may also be provided to a user in the contextual menu. Selecting the Speak to Spell feature may allow a user to verbally indicate, by way of a microphone connected to a computing device on which the word processing application is operating, a word, term or phrase the user would like to add to the document or otherwise see within the suggestion list in the second layer of the contextual menu 108 as a possible replacement for a flagged word. This feature may allow the spoken word, term or phrase to completely replace previously generated suggestions (e.g., first suggestion “Principle” and second suggestion “Principal”), add to them, or cause the word processing application to highlight, or otherwise emphasize, one of the suggestions corresponding to the spoken word, term, or phrase.

According to another example a Proofing Pane feature may also be provided to a user in the contextual menu. Selecting the Proofing Pane feature may cause a word processing application to open a separate proofing pane within the document 102, which may provide additional features helpful to a user in proofing or editing a document. For example, a proofing pane having contextual information relating to flagged issues may be provided to a user on the right or left side of document 102.

According to examples a user may access the third layer of the contextual menu 110 by, for example, selecting an arrow next to the first suggestion “Principle” or the second suggestion “Principal.” The third layer of the contextual menu 110 may provide additional contextual information related to the flagged issue 104. For example, the third layer of the contextual menu 110 may provide an option to read a suggestion aloud, auto correct future instances of the misspelled word, as well as change all instances of the misspelled word in the document. Thus, in utilizing the contextual menu, a user is not simply provided with suggestions for flagged issues within a document, but is also provided with additional context for those suggestions. Thus novel aspects provided herein assist a user to more efficiently and accurately edit a document in a customizable way.

FIG. 2A illustrates an exemplary contextual menu of a word processing application 200A for a context-sensitive spelling issue 204A in a document 202A with three layers of the contextual menu displayed. The word processing application 200A includes a first layer of a contextual menu 206A with the issue type (spelling—contextual) context feature shown at the top of the first layer of the contextual menu 206A and providing further information regarding the flagged context-sensitive spelling issue 204A.

According to aspects, the issue type header context feature (e.g., “Spelling” or “Spelling—Context” in the first layer of the contextual menu 206A) may identify the issue type and whether it is a customized or a non-customized issue type. Although the issue type header context feature as according to this example depicts “Spelling—Contextual” other headings such as “Grammar” may be used to identify a context-sensitive spelling issue such that a user may generally understand why such an issue has been flagged. Examples of non-customized issue types may be, for example, spelling, grammar and writing issues such as consistency, clarity/conciseness, vocabulary choice, inclusive language, and formal language. Examples of customized issue types may be rules or policies that an organization would like users to follow or customized issues generated by an individual user, such as, for example personalized spelling and grammar preferences, personalized consistency preferences, personalized inclusive language preferences, personalized privacy preferences and personalized branding preferences.

Also shown is a second layer of the contextual menu 208A and a third layer of the contextual menu 210A, which provide contextual information regarding flagged context-sensitive spelling issue 204A. Second layer of the contextual menu 208A provides an explanation for the issue (e.g., “Fix possible out-of-context word”) and provides a definition for the original word “affect” as well as a suggested alternative “effect” and its definition. According to some examples a user may scroll over or otherwise select a displayed synonym or definition and one or more additional synonyms or definitions for an original word or suggested replacement word may be displayed within an existing layer of the contextual menu or a new layer of the contextual menu. The second layer of the contextual menu 208A also provides selectable options to ignore the flagged context-sensitive spelling issue 204A once or to view more information regarding the flagged context-sensitive spelling issue 204A in a writing assistant.

The third layer of the contextual menu 210A similarly provides additional contextual content available to a user such as the selectable option to read the flagged context-sensitive spelling issue 204A aloud and to change the definition language for the flagged context-sensitive spelling issue 204A. The ability to change the definition language for the flagged context-sensitive spelling issue provides users whose first language is something other than English the opportunity to gain additional context for the flagged context-sensitive spelling issue 204A in their native language.

Figure 2B:
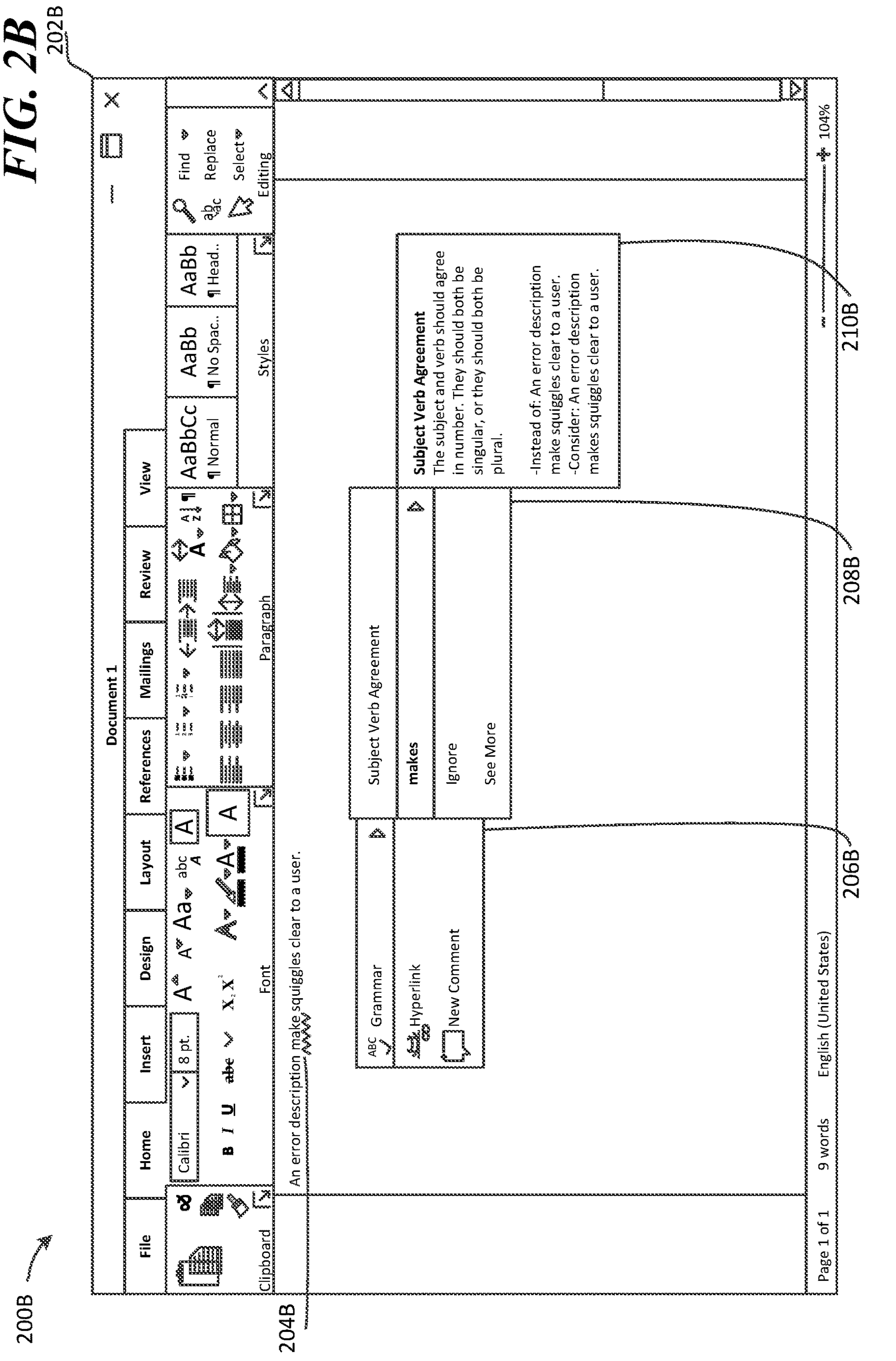
FIG. 2B illustrates an exemplary contextual menu of a word processing application for a grammar issue in a document with three layers of the contextual menu displayed.

FIG. 2B illustrates an exemplary contextual menu of a word processing application 200B for a grammar issue 204B in a document 202B with three layers of the contextual menu displayed. The word processing application 200B includes a first layer of a contextual menu 206B, with the issue type (grammar) context feature shown at the top of the first layer of the contextual menu 206B and providing information and operations that may be performed as they relate to the flagged grammar issue 204B.

Also shown is a second layer of the contextual menu 208B, which provides contextual information regarding flagged grammar issue 204B. Second layer of the contextual menu 208B provides an explanation for the issue (e.g., "Subject Verb Agreement") and provides a suggested term "makes" to replace the flagged grammar issue 204B "make." The second layer of the contextual menu 208B also provides selectable options to ignore the flagged grammar issue 204B and to see more information related to the flagged grammar issue.

The third layer of the contextual menu 210B provides additional information regarding the flagged grammar issue 204B and context regarding subject verb agreement as it relates to the flagged grammar issue 204B. Specifically, the third layer of the contextual menu 210B indicates that the subject and verb should agree in number and that the subject and verb should both be singular or they should both be plural. The third layer of the contextual menu 210B also provides exemplary replacement text in context for replacing the flagged grammar issue 204B.

Figure 3:
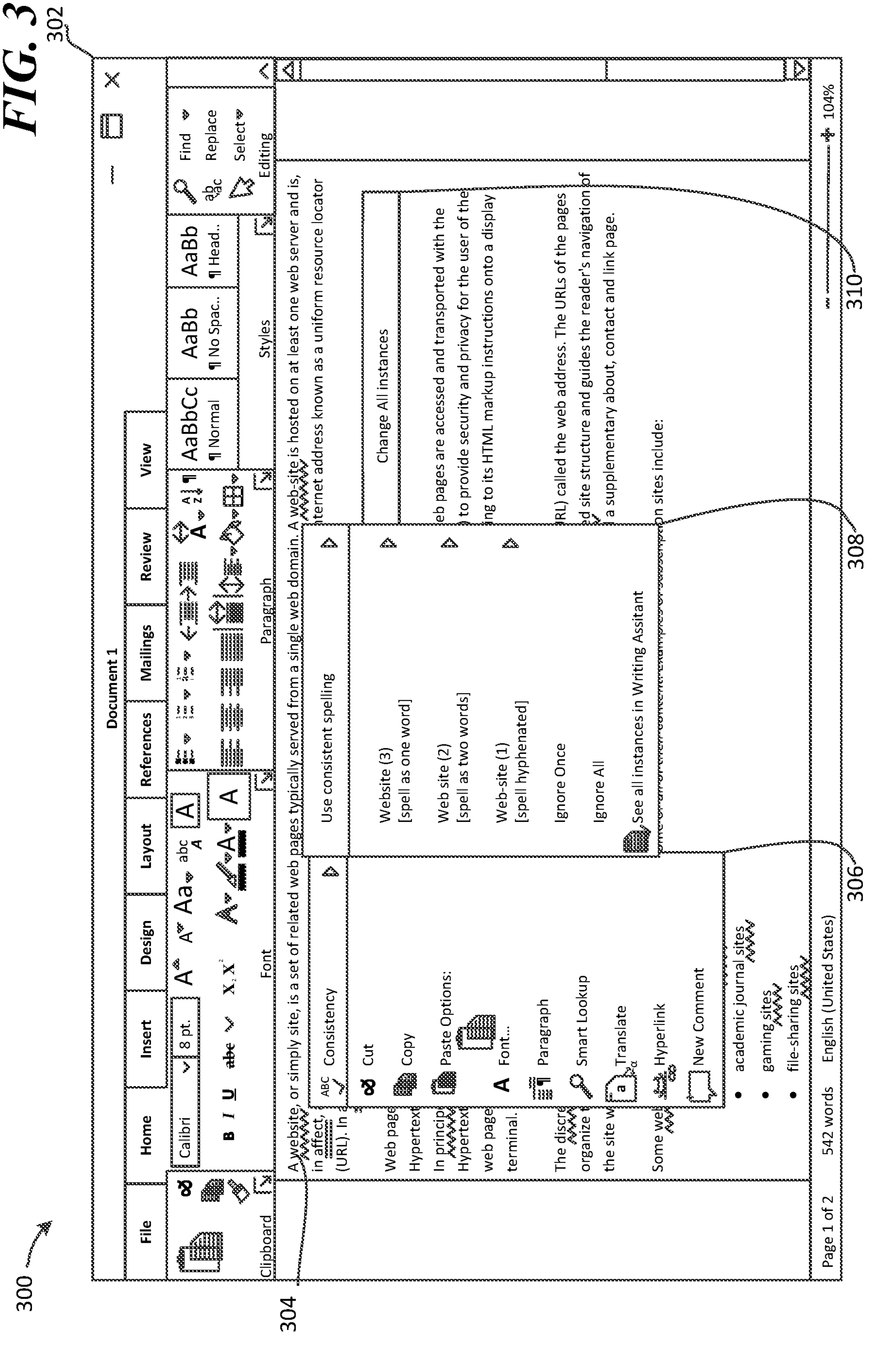
FIG. 3 illustrates an exemplary contextual menu of a word processing application for a consistency issue in a document with three layers of the contextual menu displayed.

FIG. 3 illustrates an exemplary contextual menu of a word processing application 300 for a consistency issue 304 in a document 302 with three layers of the contextual menu displayed. The word processing application 300 includes a first layer of a contextual menu 306 with the issue type (consistency) context feature shown at the top of the first layer of the contextual menu 306 and providing further information regarding the flagged consistency issue 304.

Also shown is a second layer of the contextual menu 308 and a third layer of the contextual menu 310, which provide contextual information regarding flagged consistency issue 304. Second layer of contextual menu 308 provides an explanation for the issue (e.g., "Use consistent spelling") and provides three versions of the flagged consistency issue 304 which have been used throughout the document. Specifically, a determination has been made that a user has input multiple spellings of the word "website" (i.e., website, web site, and web-site) and each of those instances has been identified in the second layer of the contextual menu 308. The second layer of the contextual menu 308 also provides selectable options to ignore the flagged consistency issue 304 once, ignore each instance of the flagged consistency issue 304 and to see all instances of the flagged consistency issue 304. The second layer of the contextual menu 308 also provides selectable arrows next to each of the various spellings for the flagged consistency issue 304 which, if selected, cause a third layer of the contextual menu 310 to pop out and provide the ability for a user to then select to change all instances of the flagged consistency issue 304 to the desired suggested spelling of that word.

Figure 4:
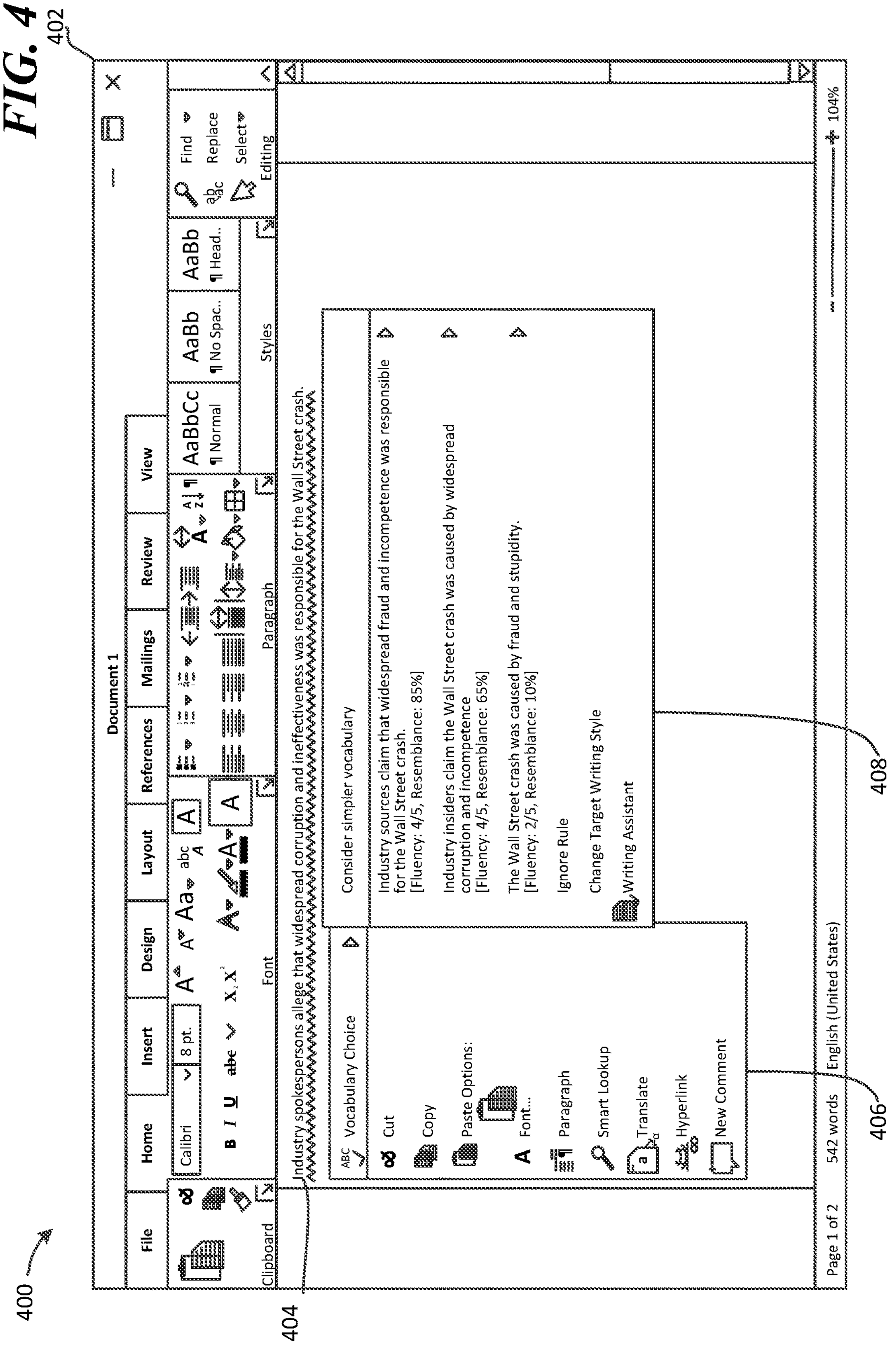
FIG. 4 illustrates an exemplary contextual menu of a word processing application for a vocabulary choice issue in a document with two layers of the contextual menu displayed.

FIG. 4 illustrates an exemplary contextual menu of a word processing application 400 for a vocabulary choice issue 404 in a document 402 with two layers of the contextual menu displayed. The word processing application 400 includes a first layer of a contextual menu 406, with the issue type (vocabulary choice) context feature shown at the top of the first layer of the contextual menu 406 and providing further information regarding the flagged vocabulary choice issue 404.

Also shown is a second layer of the contextual menu 408, which provides contextual information regarding flagged vocabulary issue 404. Second layer of the contextual menu 408 provides an explanation for the issue (e.g., "Consider simpler vocabulary") and provides three suggested replacement phrases to replace the flagged vocabulary choice issue 404.

In addition to providing suggested simpler vocabulary replacement phrases to replace the flagged vocabulary choice issue 404, a fluency metric and a resemblance to the original text is also provided beneath each suggested simpler vocabulary replacement phrase. According to this example a fluency metric on a scale of 1 to 5 is provided and a resemblance to the original text metric shown as a percentage is similarly provided. Other scales and mechanisms of display may be utilized according to the systems and methods provided herein for providing this information to a user. For example, a color scale may be used, a 1 to 10 or a 1 to 100 scale may be used, a graph or pie chart may be used to show percentages, etc. According to another example a category-based scale may be implemented. Such a category scale may include categories such as: simple (e.g., common vocabulary, simple language, accessible to children), standard (e.g., accessible books and magazines), advanced (e.g., broadsheet newspapers) and complex (e.g., highly domain specific papers, technical publications).

The fluency metric is a value-based score determined on the basis of text complexity. The fluency metric positions the document on a complexity spectrum and provides an estimation of how difficult analyzed text will be for an audience to understand. If the value calculated for fluency metric is not what an author intends additional suggestions may be presented to the author to enhance and/or simplify a document's text.

The fluency metric is calculated by combining a plurality of linguistic features that are present in complex text. These features may include the percentage of rare words used, keywords suggesting multiple clauses (e.g., because, although, whenever, etc.), sentence length, presence of punctuation, conjunctions, relative pronouns and negations, among others. The fluency metric is scalable to a variety of languages, with each feature utilized in calculating a value for the metric being language-specific.

The fluency metric provides advantages such as allowing authors to monitor their metric scores and adjust text accordingly, adding a level of extensibility to designated target audience group rules (e.g., assessing whether an author's writing is appropriate for a designated target audience), providing the ability to identify writing inconsistency in document collaboration scenarios, and providing metric data in the form of metadata that can be provided to document analysis engines that analyze one or more documents and determine patterns and other information that can be used for improving collaborative documents thus increasing the impact of documents for their desired purpose.

Figure 5:
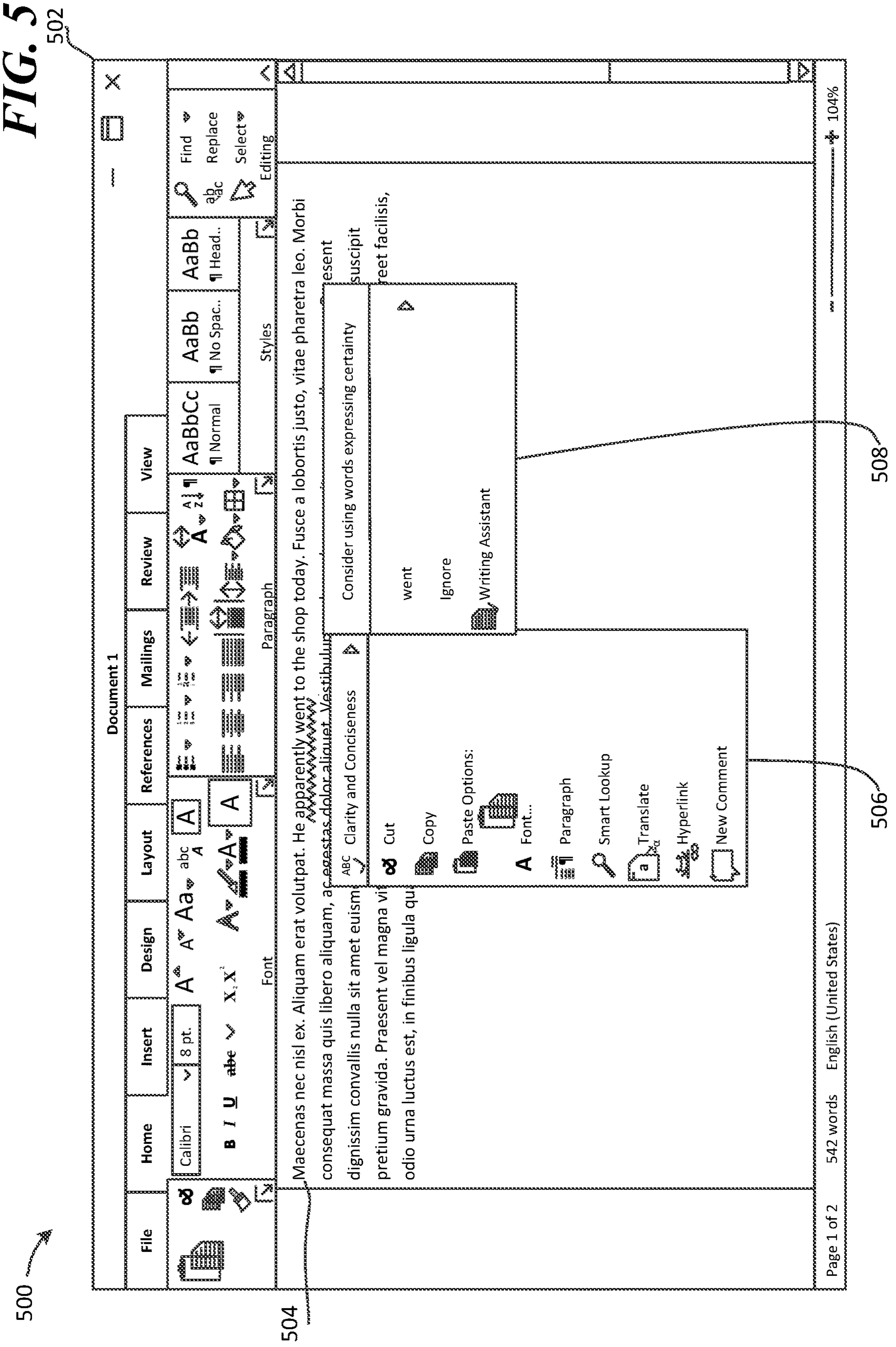
FIG. 5 illustrates an exemplary contextual menu of a word processing application for a clarity and conciseness issue in a document with two layers of the contextual menu displayed.

FIG. 5 illustrates an exemplary contextual menu of a word processing application 500 for a clarity and conciseness issue 504 in a document 502 with two layers of the contextual menu displayed. The word processing application 500 includes a first layer of a contextual menu 506 with the issue type (clarity and conciseness) context feature shown at the top of the first layer of the contextual menu 506 and providing further information regarding the flagged vocabulary choice issue 504.

Also shown is a second layer of the contextual menu 508, which provides contextual information regarding flagged clarity and conciseness issue 504. Second layer of the contextual menu 508 provides an explanation for the issue (e.g., "Consider using words expressing certainty") and provides a suggestion for replacing the flagged clarity and conciseness issue 504.

FIG. 6 illustrates an exemplary contextual menu of a word processing application 600 for an inclusive language issue 604 in a document 602 with two layers of the contextual menu displayed. The word processing application 600 includes a first layer of a contextual menu 606 with the issue type (inclusive language) context feature shown at the top of the first layer of the contextual menu 606 and providing further information regarding the flagged inclusive language issue 604.

Also shown is a second layer of the contextual menu 608, which provides contextual information regarding flagged inclusive language issue 604. Second layer of the contextual menu 608 provides an explanation for the issue (e.g., "Consider gender-neutral expression") and provides a suggested term "Police officers" to replace the flagged inclusive language issue 604 "policemen." The second layer of the contextual menu 608 also provides selectable options to ignore one or all instances of the flagged inclusive language issue 604, a selectable option to bring up a proofing pane, as well as a selectable arrow next to the suggested replacement term "Police officers" which if selected would bring up a third layer of the contextual menu and provide additional contextual information regarding the flagged inclusive language issue 604 and the suggested replacement term.

FIG. 7 illustrates an exemplary contextual menu writing assistant 708 for an accessibility issue 704 in a document 702 related to seeing impaired users. Document 702 includes text as well as an embedded image which has been flagged as an accessibility issue 704. In this instance accessibility issue 704 has been flagged using a disability icon 706 to alert the author that there is an accessibility issue 704 that may need to be addressed. In this instance when a user selects (e.g., clicking or hovering a cursor over) the disability icon 706 a writing assistant such as accessibility writing assistant 708 may appear to hover over the document 702. In this instance the writing assistant provides information related to the accessibility issue 704 noting that alternate text helps readers understand information presented in images and other objects and a text box is provided with a prompt to textually describe the image. Upon inputting text into the text box and updating the document 702 with that information the input text may appear adjacent to the image or the text may appear if the image is clicked on or hovered over with a cursor. Additionally or alternatively, the input text may be read aloud when a user clicks on the image or hovers a cursor over the image.

FIG. 7 provides just one example of an accessibility issue 704 that may be addressed with a writing assistant 708. Other accessibility issues may be similarly addressed such as font color, size and contrast issues that may be difficult for seeing impaired users to view or process, embedded video and sound files that may be difficult for seeing and hearing impaired users to view, hear and process, etc.

Figure 8:
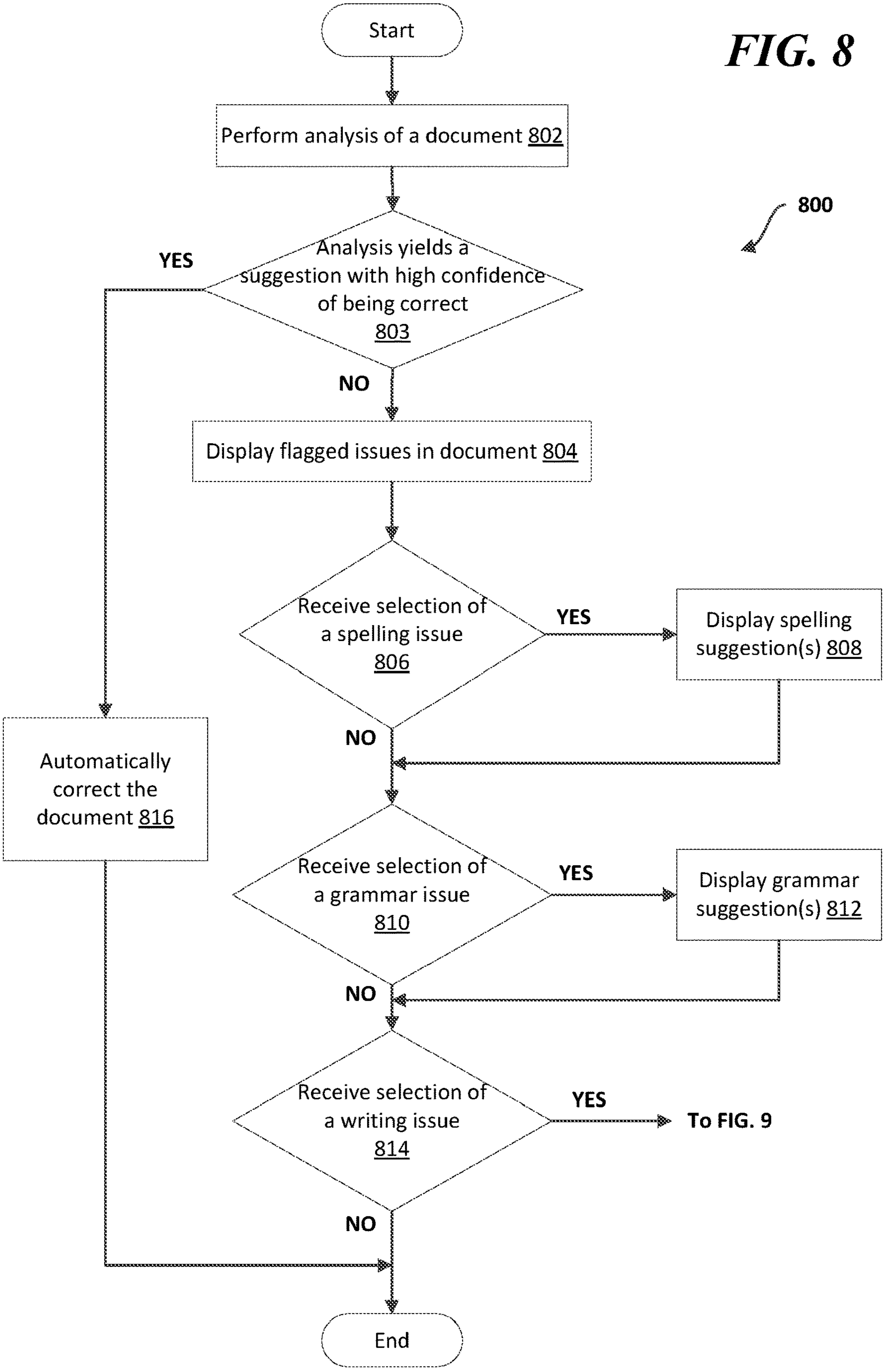
FIG. 8 and FIG. 9 depict an exemplary method for implementing a contextual menu of a word processing application.
Figure 9:
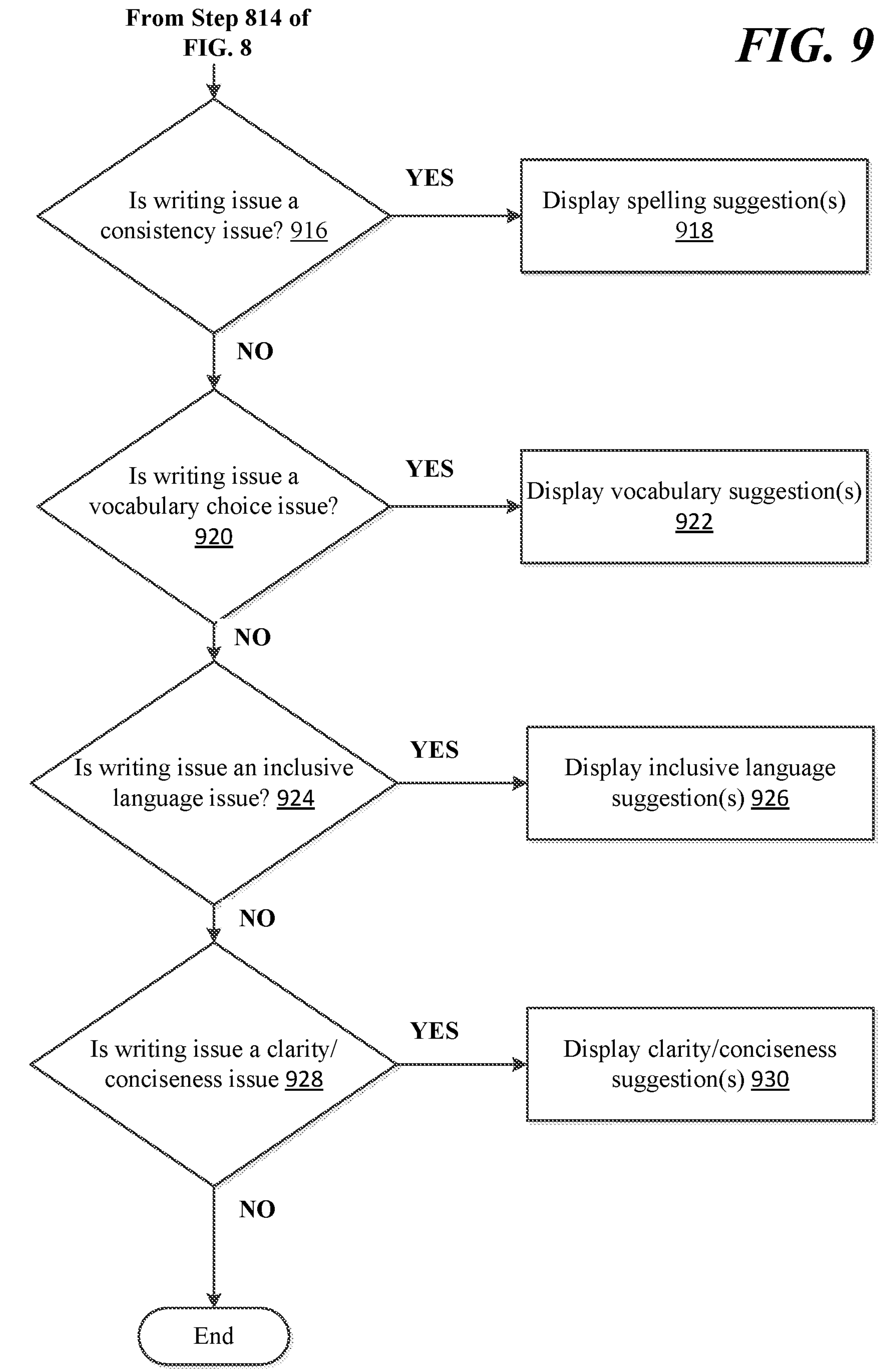

FIG. 8 and FIG. 9 depict an exemplary method for implementing a contextual menu of a word processing application. Method 800 begins at a start operation and flow continues to operation 802 where a word processing application performs an analysis of a document. The analysis may determine if there are words, terms and/or phrases within a document that have spelling issues, grammar issues, and/or writing issues. As described, this analysis performs a check of the document against one or more rules or guidelines. At operation 803 if a determination is made that the analysis has yielded a suggestion with a high confidence of being correct, flow continues to operation 816 where the suggestion may be automatically corrected in the document and the method may flow to an end operation. Alternatively, if a determination is made that the analysis has not yielded a suggestion with a high confidence of being correct, flow may move from operation 803 to operation 804 where issues are displayed. The displayed issues may be flagged in the document such that they will be easily recognizable, and the particular issue type identified, by a user. For example, if the document contains spelling issues, those issues may be underlined, highlighted and/or otherwise emphasized in red; if the document contains grammar issues, those issues may be underlined, highlighted and/or otherwise emphasized in blue; and if the document contains writing issues, those issues may be underlined, highlighted and/or otherwise emphasized in yellow. These colors are provided only by way of example and other colors and emphasizing criteria may be utilized for the same purpose.

At operation 806 it is determined whether a selection of a spelling issue is made. Such a selection may be made by various methods including right clicking on a flagged spelling issue, placing a cursor over a flagged spelling issue, touching a display at a location around a flagged spelling issue, etc. According to some examples, the spelling issue referenced at operation 806 may be a context-sensitive spelling issue as more fully described with reference to FIG. 2A. If a selection of a spelling issue is received, flow proceeds to operation 808 in which a contextual menu is provided with one or more spelling suggestions or explanations. If at 806 no selection of a spelling issue has been received flow continues to operation 810.

At operation 810 it is determined whether a selection of a grammar issue is made. Such a selection may be made by the same methods described with regard to operation 806. If a selection of a grammar issue is received, flow proceeds to operation 812 in which a contextual menu is provided with one or more grammar suggestions or explanations. If at 810 no selection of a grammar issue has been received flow continues to operation 814.

At operation 814, it is determined whether a selection of a writing issue is made. Such a selection may be made by the same methods described with regard to operation 806. If no selection of a writing issue is received, the method ends. If a selection of a writing issue is received flow continues to operation 916 shown in FIG. 9.

At operation 916 it is determined whether the writing issue is a consistency issue. If the writing issue is determined to be a consistency issue flow moves to operation 918 where one or more consistency suggestions or explanations are displayed in a contextual menu. If the writing issue is not a consistency issue flow continues to operation 920.

At operation 920 it is determined whether the writing issue is a vocabulary choice issue. If the writing issue is determined to be a vocabulary choice issue, flow proceeds to operation 922 where one or more vocabulary suggestions or explanations are displayed in a contextual menu. If the writing issue is not a vocabulary choice issue, flow continues to operation 924.

At operation 924 it is determined whether the writing issue is an inclusive language issue. If the writing issue is determined to be an inclusive language issue, flow moves to operation 926 where one or more inclusive language suggestions or explanations are displayed in a contextual menu. If the writing issue is not an inclusive language issue flow continues to operation 928.

At operation 928 it is determined whether the writing issue is a clarity and conciseness issue. If the writing issue is determined to be a clarity and conciseness issue, flow moves to operation 930 where a clarity and conciseness suggestion or an explanation of the issue are displayed in a contextual menu.

Figure 10:
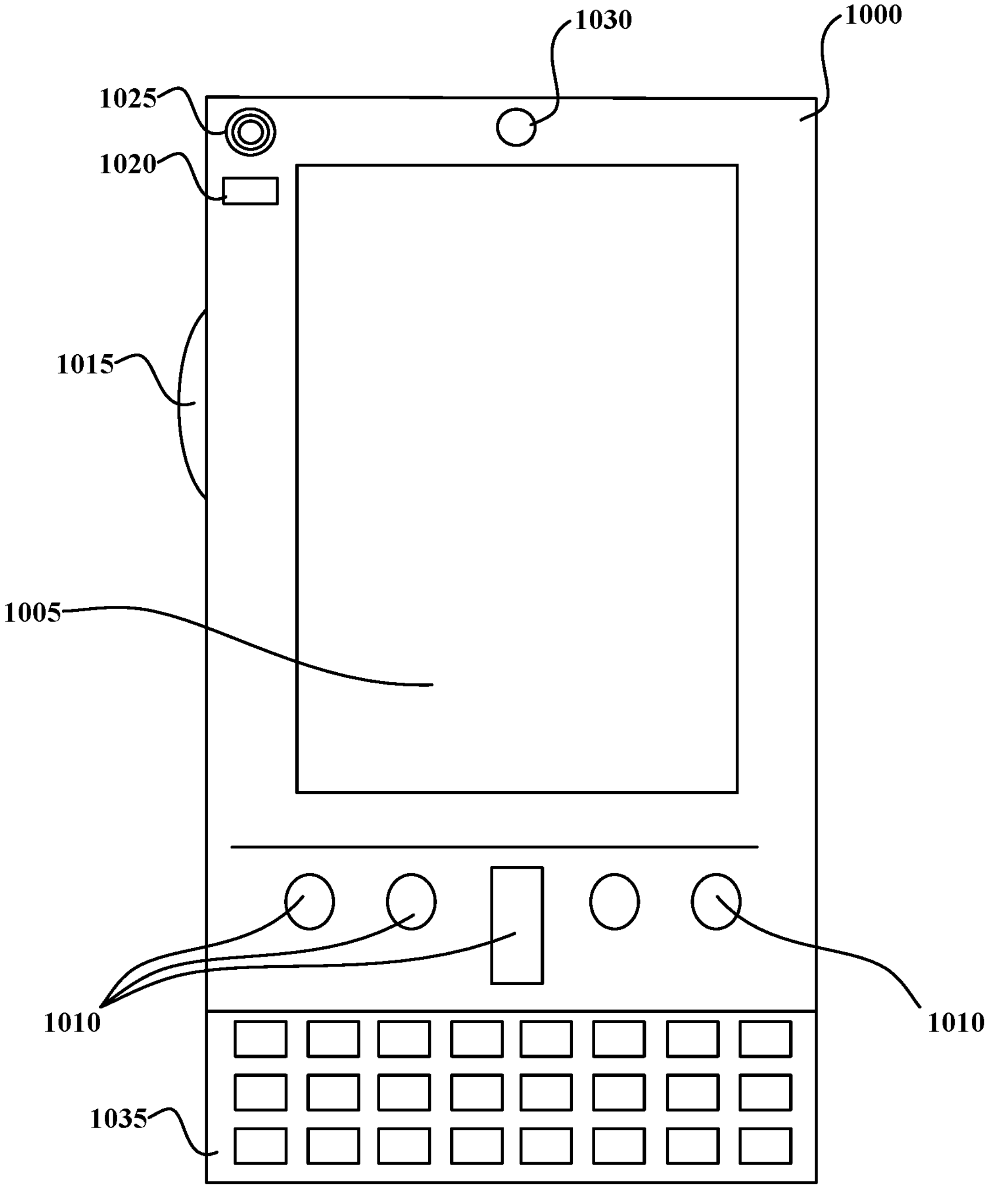
FIG. 10 illustrates a computing device for executing one or more aspects of the present disclosure.
Figure 11:
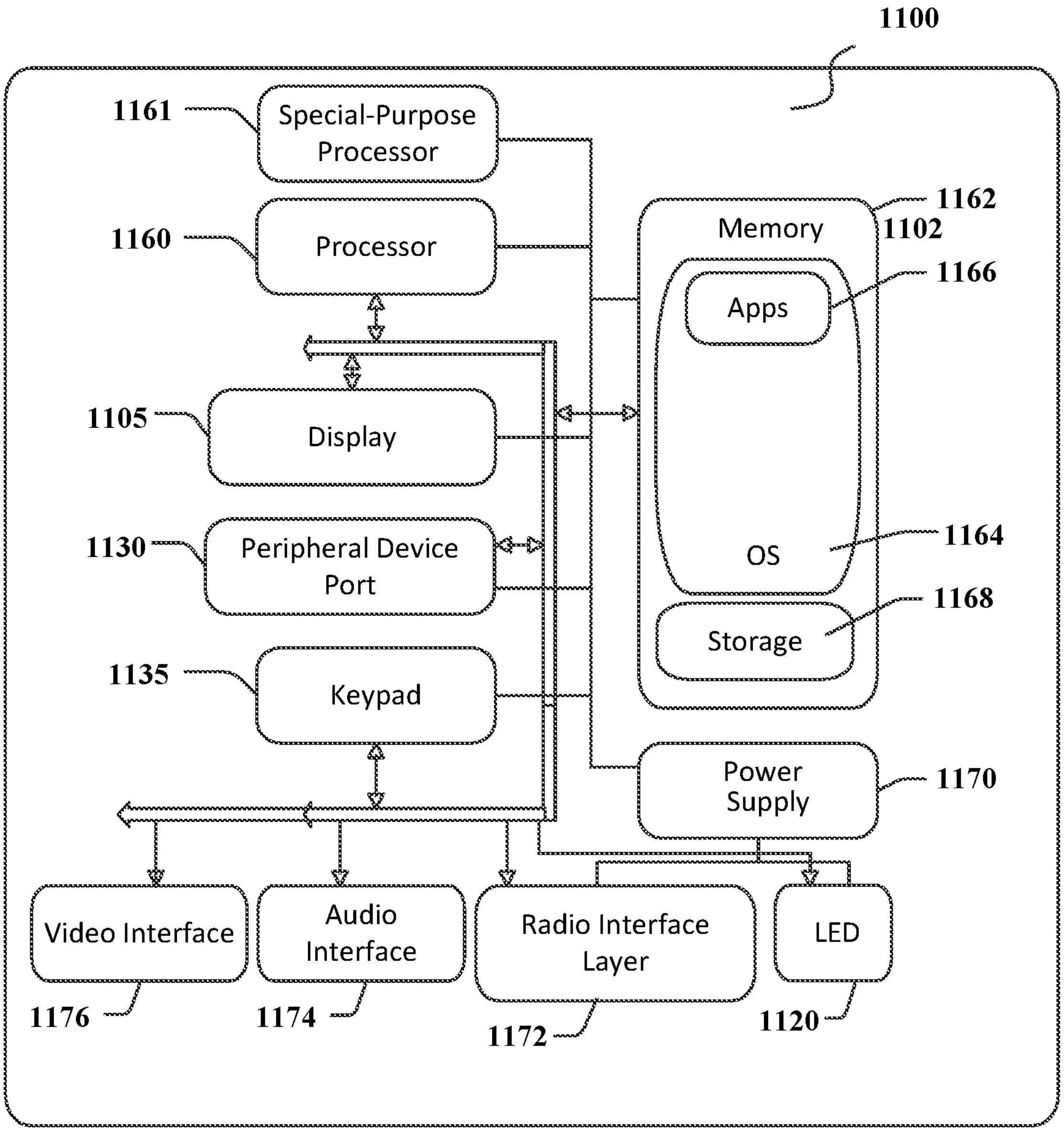
FIG. 11 is a simplified block diagram of a computing device with which aspects of the present disclosure may be practiced.

FIG. 10 and FIG. 11 illustrate computing device 1000, for example, a mobile telephone, a smart phone, a tablet personal computer, a laptop computer, and the like, with which embodiments of the disclosure may be practiced. With reference to FIG. 10, an exemplary mobile computing device 1000 for implementing the embodiments is illustrated. In a basic configuration, the mobile computing device 1000 is a handheld computer having both input elements and output elements. The mobile computing device 1000 typically includes a display 1005 and one or more input buttons 1010 that allow the user to enter information into the computing device 1000. The display 1005 of the mobile computing device 900 may also function as an input device (e.g., a touch screen display). If included, an optional side input element 1015 allows further user input. The side input element 1015 may be a rotary switch, a button, or any other type of manual input element. In alternative embodiments, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode) and/or an audio transducer 1025 (e.g., a speaker). In some embodiments, the mobile computing device 1000 incorporates a vibration transducer for providing the user with tactile feedback. In yet another embodiments, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device. In embodiments, the word processing application may be displayed on the display 1005.

FIG. 11 is a block diagram illustrating the architecture of one embodiment of a mobile computing device. That is, the mobile computing device 1100 can incorporate a system (i.e., an architecture) 1102 to implement some aspects of the disclosure. In one aspect the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and a wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, diagramming applications, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored in the host computer. As should be appreciated, other applications may be loaded into the memory 1162 and run on the mobile computing device 1100, including steps and methods of performing a rule-based analysis of an electronic document comprising a review for a plurality of writing issues related to the electronic document's conformance to a specified target audience; causing, in an application associated with the electronic document, one or more flagged writing issues identified by the analysis of the electronic document to be displayed; receiving a selection of a flagged writing issue; and based on the selection of the flagged writing issue, causing, in a contextual menu, one or more alternative suggestions to replace text associated with the flagged writing issue to be displayed, the one or more alternative suggestions based, at least in part, on a fluency metric and a resemblance of the one or more alternative suggestions to the text associated with the flagged writing issue.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio 1172 that performs the functions of transmitting and receiving radio frequency communications. The radio 1172 facilitates wireless connectivity between the system 1102 and the "outside world," via a communications carrier or service provider. Transmissions to and from the radio 1172 are conducted under control of the operating system 1164. In other words, communications received by the radio 1172 may be disseminated to the application programs 1166 via the operating system 1164, and vice versa. The radio 1172 allows the system 1102 to communicate with other computing devices such as over a network. The radio 1172 is one example of communication media. Communication media may typically be embodied by computer readable instructions, data structures, program modules, or other data in a modulated data signal, such as a carrier wave or other transport mechanism, and includes any information deliver media. The term "modulated data signal" means a signal that has one or more of its characteristics set or changed in such a manner as to encode information in the signal. By way of example, not limitation, communication media includes wired media such as a wired network or direct-wired connection, and wireless media such as acoustic, RF infrared and other wireless media. The term computer readable media is used herein includes both storage media and communication media.

This embodiment of the system 1102 provides notifications using the visual indicator 1020 that can be used to provide visual notifications and/or an audio interface 1174 producing audible notifications via the audio transducer 1025. In the illustrated embodiment, the visual indicator 1020 is a light emitting diode (LED) and the audio transducer 1025 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1025, the audio interface 1174 may also be coupled to a microphone to receive audible input, such as to facilitate a telephone conversation. In accordance with embodiments of the present invention, the microphone may also serve as an audio sensor to facilitate control of notifications, as will be described below. The system 1102 may further include a video interface 1176 that enables an operation of an on-board camera 1030 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11 by the non-volatile storage area 1168. Computer storage media may include volatile and nonvolatile, removable and non-removable media implemented in any method or technology for storage of information, such as computer readable instructions, data structures, program modules, or other data.

Data/information generated or captured by the mobile computing device 1100 and stored via the system 1102 may be stored locally on the mobile computing device 1100, as described above, or the data may be stored on any number of storage media that may be accessed by the device via the radio 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio 1172 or via a distributed computing network. Similarly, such data/information may be readily transferred between computing devices for storage and use according to well-known data/information transfer and storage means, including electronic mail and collaborative data/information sharing systems.

One of skill in the art will appreciate that the scale of systems such as system 1102 may vary and may include more or fewer components than those described in FIG. 11. In some examples, interfacing between components of the system 1102 may occur remotely, for example where components of system 1102 may be spread across one or more devices of a distributed network. In examples, one or more data stores/storages or other memory are associated with system 1102. For example, a component of system 1102 may have one or more data storages/memories/stores associated therewith. Data associated with a component of system 1102 may be stored thereon as well as processing operations/instructions executed by a component of system 1102.

Figure 12:
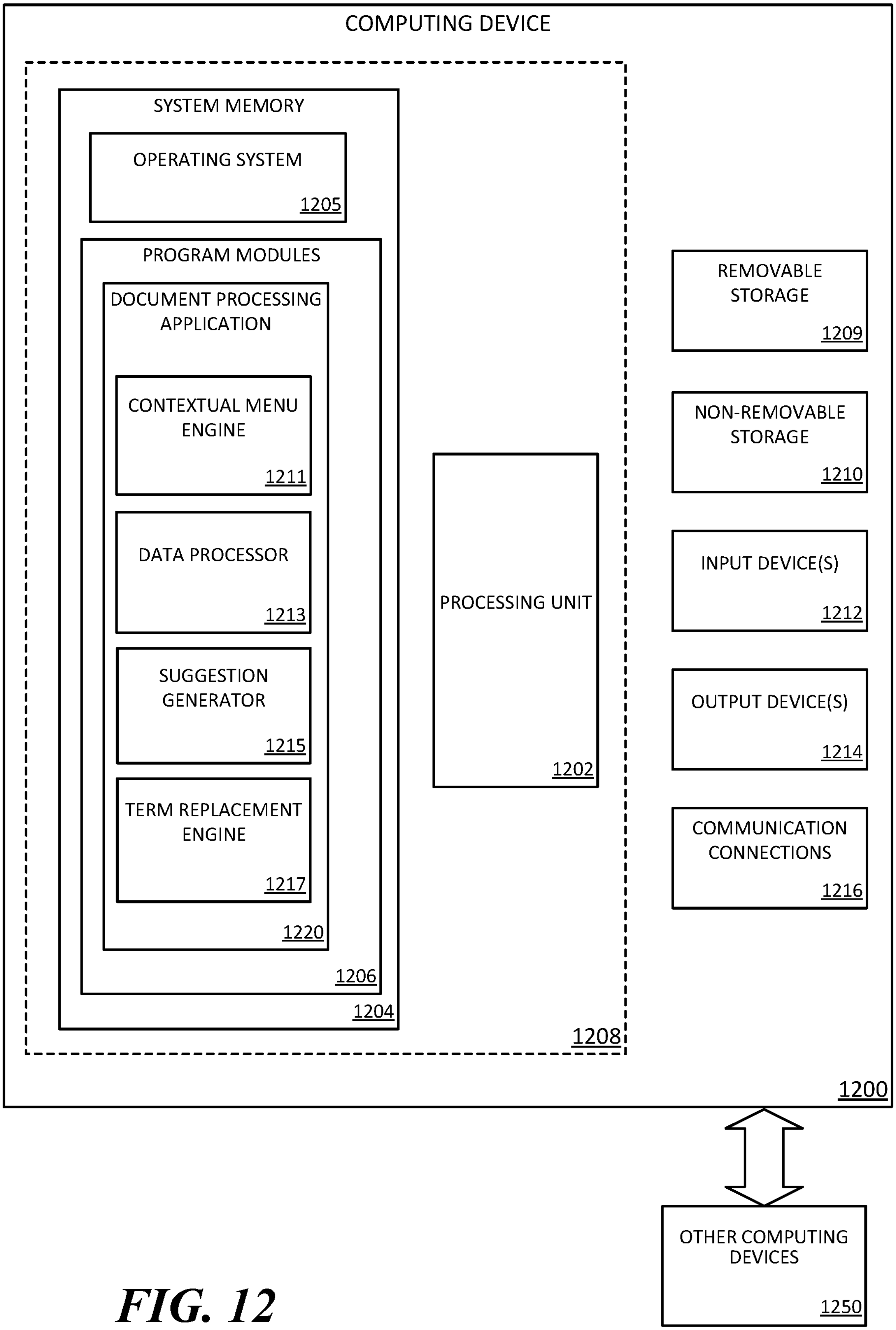
FIG. 12 is a block diagram illustrating physical components (e.g., hardware) of a computing device 1200 with which aspects of the present disclosure may be practiced.

FIG. 12 is a block diagram illustrating physical components (e.g., hardware) of a computing device 1200 with which aspects of the disclosure may be practiced. The computing device components described below may have computer executable instructions for performing a rule-based analysis of an electronic document comprising a review for a plurality of writing issues related to the electronic document's conformance to a specified target audience; causing, in an application associated with the electronic document, one or more flagged writing issues identified by the analysis of the electronic document to be displayed; receiving a selection of a flagged writing issue; and based on the selection of the flagged writing issue, causing, in a contextual menu, one or more alternative suggestions to replace text associated with the flagged writing issue to be displayed, the one or more alternative suggestions based, at least in part, on a fluency metric and a resemblance of the one or more alternative suggestions to the text associated with the flagged writing issue, on a server computing device, including computer executable instructions for document processing application 1220 that can be executed to employ the methods disclosed herein. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories. The system memory 1204 may include an operating system 1205 and one or more program modules 1206 suitable for document processing application 1220, such as one or more components in regards to FIG. 12 and, in particular, contextual menu engine 1211, data processor 1213, suggestion generator 1215, and term replacement engine 1217. The operating system 1205, for example, may be suitable for controlling the operation of the computing device 1200. Furthermore, aspects of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., document processing application 1220) may perform processes including, but not limited to, the aspects, as described herein. Other program modules that may be used in accordance with aspects of the present disclosure, and in particular may include contextual menu engine 1211, data processor 1213, suggestion generator 1215 or term replacement engine 1217, etc.

According to examples, data corresponding to a document in a word processing application may be processed by data processor 1213 and used by suggestion generator 1215, prior to running term replacement engine 1217.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1200 may also have one or more input device(s) 1212 such as a keyboard, a mouse, a pen, a sound or voice input device, a touch or swipe input device, etc. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 1204. While executing on processing unit 1202, program modules (e.g., applications, Input/Output (I/O) management, and other utilities) may perform processes including, but not limited to, one or more of the stages of the operational methods described herein such as method 800 illustrated in FIG. 8 and FIG. 9, for example.

Figure 13:
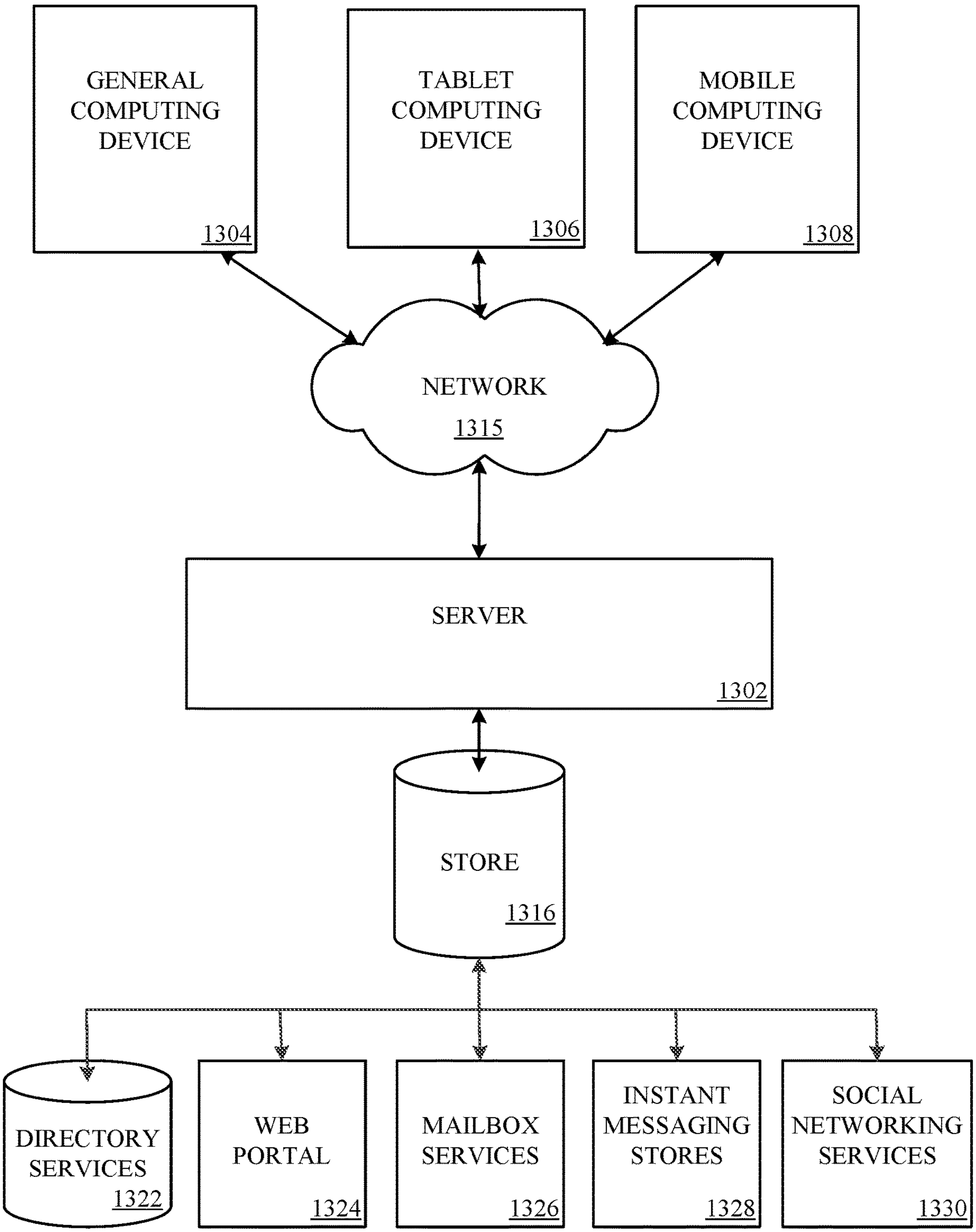
FIG. 13 is a simplified block diagram of a distributed computing system in which aspects of the present disclosure may be practiced.

FIG. 13 illustrates one aspect of the architecture of a system for processing data received at a computing system from a remote source, such as a personal/general computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The enterprise document processing application 1206 may be employed by a client that communicates with server device 1302, and/or the enterprise document processing application 1206 may be employed by server device 1302. The server device 1302 may provide data to and from a client computing device such as a personal/general computer 1304, a tablet computing device 1306 and/or a mobile computing device 1308 (e.g., a smart phone) through a network 1315. By way of example, the computer system described above with respect to FIGS. 10-14 may be embodied in a personal/general computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Figure 14:
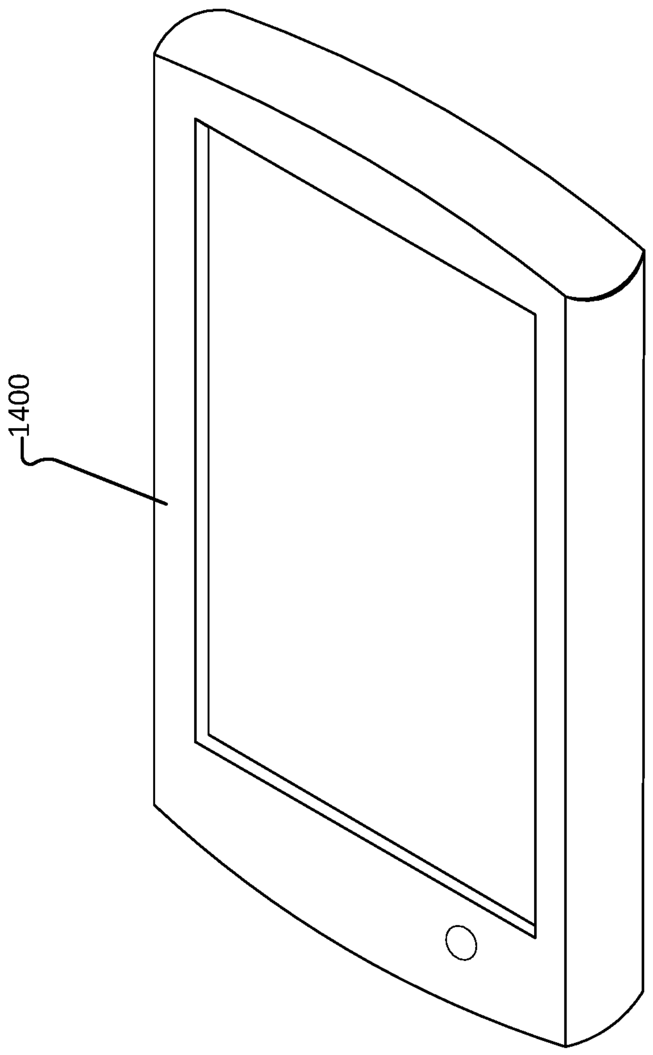
FIG. 14 illustrates a tablet computing device for executing one or more aspects of the present disclosure.

FIG. 14 illustrates an exemplary tablet computing device 1400 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

We claim:

1. A computer-based method for causing a contextual menu in an electronic document to be displayed, comprising:

performing a first analysis of the electronic document comprising a review for a plurality of writing issues related to the electronic document's conformance to a specified target audience;

causing, in an application associated with the electronic document, one or more flagged writing issues identified by the analysis of the electronic document to be displayed;

receiving a selection of a flagged writing issue; and based on the selection of the flagged writing issue, causing, in the contextual menu, display of:

an issue type context feature including an explanation of the flagged writing issue;

one or more alternative suggestions to replace text associated with the flagged writing issue; and a fluency metric and a resemblance score alongside each of the one or more alternative suggestions, the resemblance score indicating a resemblance of the one or more alternative suggestions to the text associated with the flagged writing issue, the one or more alternative suggestions based, at least in part, on the fluency metric and the resemblance of the one or more alternative suggestions to the text associated with the flagged writing issue, wherein the fluency metric is determined from a text complexity analysis of the one or more alternative suggestions to the text associated with the flagged writing issue, the text complexity analysis being based on a complexity spectrum representing how difficult the one or more alternative suggestions will be for the specified target audience to understand.

2. The method of claim 1, further comprising:

performing a second analysis and a contextual language model analysis of the electronic document comprising a review for a plurality of spelling and grammar issues;

causing, via a graphical user interface, at least one flagged spelling issue and at least one flagged grammar issue to be displayed;

receiving a selection of an issue selected from one of: the at least one flagged spelling issue and the at least one flagged grammar issue; and based on the selection of the at least one flagged spelling issue and the at least one flagged grammar issue, causing in the contextual menu, one or more alternative suggestions to replace the selected spelling or grammar issue to be displayed.

3. The method of claim 2, further comprising, causing, in the application associated with the electronic document at least one of: at least one selectable action associated the one or more alternative suggestions for the one or more flagged writing issues to be displayed, at least one selectable action associated with the one or more alternative suggestions for the at least one flagged spelling issue to be displayed, and at least one selectable action associated with the one or more alternative suggestions for the at least one flagged grammar issue to be displayed.

4. The method of claim 2, further comprising:

receiving a selection of an audio option associated with at least one of: the one or more flagged writing issues, the at least one flagged spelling issue, and the at least one flagged grammar issue; and based on the selection of the audio option, providing feedback selected from at least one of: audibly reading one or more words associated with at least one of: the one or more flagged writing issues, the at least one flagged spelling issue, and the at least one grammar issue aloud; audibly reading a definition of one or more words associated with at least one of: the flagged writing issue, the at least one flagged spelling issue, and the at least one grammar issue, aloud; audibly reading a synonym of one or more words associated with at least one of: the flagged writing issue, the at least one flagged spelling issue, and the at least one grammar issue, aloud; audibly reading a usage sample of one or more words associated with at least one of: the flagged writing issue, the at least one flagged spelling issue, and the at least one grammar issue, aloud; audibly reading a translation in a foreign language of one or more words associated with at least one of: the flagged writing issue the at least one flagged spelling issue, and the at least one grammar issue, aloud; and audibly reading a translation in a foreign language of one or more words associated with at least one of: the flagged writing issue, the at least one flagged spelling issue, and the at least one grammar issue, aloud.

5. The method of claim 4, wherein the fluency metric is a value-based score determined from a text complexity analysis of a plurality of linguistic features selected from the group comprising: a percentage of rare words in analyzed text, the presence of keywords indicative of multiple clauses in analyzed text, sentence length of analyzed text, presence of punctuation in analyzed text, presence of conjunctions in analyzed text, presence of relative pronouns in analyzed text, and presence of negations in analyzed text.

6. The method of claim 5, further comprising:

audibly reading the fluency metric and the resemblance of the one or more alternative suggestion to the text associated with the flagged writing issue.

7. The method of claim 1, further comprising:

performing a third analysis of the electronic document comprising a review for a plurality of accessibility issues;

causing, via a graphical user interface, at least one flagged accessibility issue to be displayed;

receiving a selection of a flagged accessibility issue; and based on the selection of the flagged accessibility issue, causing, in the contextual menu, a suggestion for making the flagged accessibility issue more accessible by users of a group to be displayed, the group selected from at least one of visually impaired users and audibly impaired users.

8. The method of claim 7, wherein the suggestion for making the flagged accessibility issue more accessible by users relates to at least one of: causing a larger font size for text to be displayed, causing a different color for text to be displayed, causing an increased contrast between displayed text and a background to be displayed, causing explanatory text associated with an image to be displayed.

9. The method of claim 1, wherein performing the first analysis of the electronic document further comprises a review for run-on sentences, complex sentences, and complex word usage, wherein the review for complex sentences includes a review for sentences with multiple parts or clauses, and wherein the review for complex word usage includes a review for usage of compound words or words with prefixes, words with suffixes, or words with contractions.

10. The method of claim 1, wherein performing the first analysis of the electronic document further comprises a review of the electronic document for a plurality of issues related to formal language, wherein the review of the electronic document for the plurality of issues related to formal language includes a review for language including contractions, relative clauses without relative pronouns, ellipsis, or words with origins in Latin or Greek.

11. The method of claim 10, wherein the review of the electronic document for the plurality of issues related to formal language includes a review for language that does not conform to a target audience.

12. The method of claim 1, wherein performing the first analysis of the electronic document further comprises a review of the electronic document for a plurality of issues related to inclusive language, wherein the review of the electronic document for the plurality of issues related to inclusive language includes a review for language that excludes a group of individuals selected from at least one of: age, race, sex, physical ability, mental ability, political affiliation and religion.

13. The method of claim 1, wherein performing the first analysis of the electronic document further comprises a review of the electronic document for a plurality of issues related to vocabulary choice based on the specified target audience.

14. The method of claim 1, wherein the first analysis comprises at least one of: a rule-based analysis, a language modeling-based analysis, and a machine learning-based analysis.

15. The method of claim 1, wherein the fluency metric is displayed on a numeric scale, a color scale, a graph, a pie chart, or a category-based scale.

16. The method of claim 1, wherein the fluency metric comprises a scaled numerical value presented alongside the one or more alternative suggestions.

17. The method of claim 1, wherein the resemblance score comprises a percentage value.

18. A system for causing a contextual menu in an electronic document to be displayed, comprising:

a memory for storing executable program code; and a processor, functionally coupled to the memory, the processor being responsive to computer-executable instructions contained in the program code and operative to:

perform a first analysis of the electronic document comprising a review for a plurality of writing issues related to the electronic document's conformance to a specified target audience;

cause, in an application associated with the electronic document, one or more flagged writing issues identified by the analysis of the electronic document to be displayed;

receive a selection of a flagged writing issue; and based on the selection of the flagged writing issue, cause, in the contextual menu, display of:

an issue type context feature including an explanation of the flagged writing issue;

one or more alternative suggestions to replace text associated with the flagged writing issue; and a fluency metric and a resemblance score alongside each of the one or more alternative suggestions, the resemblance score indicating a resemblance of the one or more alternative suggestions to the text associated with the flagged writing issue, the one or more alternative suggestions based, at least in part, on the fluency metric and the resemblance of the one or more alternative suggestions to the text associated with the flagged writing issue, wherein the fluency metric is determined from a text complexity analysis of the one or more alternative suggestions to the text associated with the flagged writing issue, the text complexity analysis being based on a complexity spectrum representing how difficult the one or more alternative suggestions will be for the specified target audience to understand.

19. The system of claim 18, wherein the processor is further responsive to computer executable instructions contained in the program code and operative to:

perform an accessibility analysis of the electronic document comprising a review for a plurality of accessibility issues;

cause, via a graphical user interface, at least one flagged accessibility issue to be displayed;

receive a selection of a flagged accessibility issue; and based on the selection of the flagged accessibility issue, cause, in the contextual menu, a suggestion for making the flagged accessibility issue more accessible by users of a group to be displayed, the group selected from at least one of visually impaired users and audibly impaired users.

20. The system of claim 18, wherein performing the first analysis of the electronic document further comprises a review of the electronic document for a plurality of issues related to at least one of: run-on sentences, complex sentences, complex word usage, formal language, and inclusive language, wherein the review for complex sentences includes a review for sentences with multiple parts or clauses, wherein the review for complex word usage includes a review for usage of compound words or words with prefixes, words with suffixes, or words with contractions, wherein the review of the electronic document for the plurality of issues related to formal language includes a review for language including contractions, relative clauses without relative pronouns, ellipsis, or words with origins in Latin or Greek, wherein the review of the electronic document for the plurality of issues related to inclusive language includes a review for language that excludes a group of individuals selected from at least one of: age, race, sex, physical ability, mental ability, political affiliation and religion, and wherein complex sentences include sentences with multiple parts or clauses.

21. A computer-readable storage device comprising executable instructions that, when executed by a processor, cause a contextual menu in an electronic document to be displayed, the computer-readable storage device including instructions executable by the processor to:

perform a first analysis of the electronic document comprising a review for a plurality of writing issues related to the electronic document's conformance to a specified target audience;

cause, in an application associated with the electronic document, one or more flagged writing issues identified by the analysis of the electronic document to be displayed;

receive a selection of a flagged writing issue; and based on the selection of the flagged writing issue, cause, in the contextual menu, display of:

an issue type context feature including an explanation of the flagged writing issue;

one or more alternative suggestions to replace text associated with the flagged writing issue; and a fluency metric and a resemblance score alongside each of the one or more alternative suggestions, the resemblance score indicating a resemblance of the one or more alternative suggestions to the text associated with the flagged writing issue, the one or more alternative suggestions based, at least in part, on the fluency metric and the resemblance of the one or more alternative suggestions to the text associated with the flagged writing issue, wherein the fluency metric is determined from a text complexity analysis of the one or more alternative suggestions to the text associated with the flagged writing issue, the text complexity analysis being based on a complexity spectrum representing how difficult the one or more alternative suggestions will be for the specified target audience to understand.

22. The computer-readable storage device of claim 21, the instructions further executable by the processor to:

perform an accessibility analysis of the electronic document comprising a review for a plurality of accessibility issues;

cause, via a graphical user interface, at least one flagged accessibility issue to be displayed;

receive a selection of a flagged accessibility issue; and based on the selection of the flagged accessibility issue, cause, in the contextual menu, a suggestion for making the flagged accessibility issue more accessible by users of a group to be displayed, the group selected from at least one of visually impaired users and audibly impaired users.

* * * * *